(12) United States Patent
Nakajima et al.

(10) Patent No.: US 11,070,776 B2
(45) Date of Patent: Jul. 20, 2021

(54) LIGHT SOURCE DRIVE DEVICE, LIGHT SOURCE DRIVE METHOD, AND DISPLAY APPARATUS

(71) Applicant: JVC KENWOOD Corporation, Yokohama (JP)

(72) Inventors: Nobuki Nakajima, Yokohama (JP); Takatsugu Aizaki, Yokohama (JP)

(73) Assignee: JVC KENWOOD Corporation, Yokohama (JP)

( * ) Notice: Subject to any disclaimer, the term of this patent is extended or adjusted under 35 U.S.C. 154(b) by 126 days.

(21) Appl. No.: 15/138,537

(22) Filed: Apr. 26, 2016

(65) Prior Publication Data
US 2016/0323549 A1 Nov. 3, 2016

(30) Foreign Application Priority Data
May 1, 2015 (JP) .............................. JP2015-094023

(51) Int. Cl.
*H04N 9/31* (2006.01)
*G03B 21/00* (2006.01)

(52) U.S. Cl.
CPC ......... *H04N 9/3155* (2013.01); *G03B 21/006* (2013.01); *H04N 9/312* (2013.01); *H04N 9/3161* (2013.01); *H04N 9/3167* (2013.01)

(58) Field of Classification Search
CPC .................................................. H04N 9/3155
USPC ......................................................... 348/678
See application file for complete search history.

(56) References Cited

U.S. PATENT DOCUMENTS

| 2005/0128223 | A1* | 6/2005 | Ghozeil | G09G 3/2022 345/690 |
| 2008/0218458 | A1* | 9/2008 | Endo | H04N 9/3111 345/83 |
| 2009/0103053 | A1* | 4/2009 | Ichikawa | H04N 5/7458 353/33 |
| 2009/0284502 | A1* | 11/2009 | Hayafuji | G09G 3/2025 345/205 |
| 2016/0086574 | A1* | 3/2016 | Buckley | G09G 5/10 345/690 |

FOREIGN PATENT DOCUMENTS

| JP | 11-509647 | 8/1999 |
| JP | 2001-175216 | 6/2001 |
| JP | 2002-297085 | 10/2002 |
| JP | 2007-078866 | 3/2007 |
| JP | 2013-092548 | 5/2013 |
| JP | 2014-115430 | 6/2014 |

* cited by examiner

*Primary Examiner* — John W Miller
*Assistant Examiner* — Justin B Sanders
(74) *Attorney, Agent, or Firm* — Amin, Turocy & Watson, LLP

(57) ABSTRACT

Divided periods by dividing a frame of a video signal are produced. A display element is ON-OFF controlled on a pixel-by-pixel basis according to a video signal in accordance with the divided periods preassigned to each gradation. The light amount of a light source for emitting light to the display element is controlled so that a first light amount in a first divided period corresponding to the lowest gradation except black display becomes a light amount lower than a second light amount in a second divided period other than the first divided period.

6 Claims, 17 Drawing Sheets

FIG.3

| SF \ GRADATION | SF1 | SF2 | SF3 | SF4 | SF5 | SF6 | SF7 | SF8 | SF9 | SF10 | SF11 | SF12 |
|---|---|---|---|---|---|---|---|---|---|---|---|---|
| 0  | 0 | 0 | 0 | 0 | 0 | 0 | 0 | 0 | 0 | 0 | 0 | 0 |
| 1  | 1 | 0 | 0 | 0 | 0 | 0 | 0 | 0 | 0 | 0 | 0 | 0 |
| 2  | 1 | 1 | 0 | 0 | 0 | 0 | 0 | 0 | 0 | 0 | 0 | 0 |
| 3  | 1 | 1 | 1 | 0 | 0 | 0 | 0 | 0 | 0 | 0 | 0 | 0 |
| 4  | 1 | 1 | 1 | 1 | 0 | 0 | 0 | 0 | 0 | 0 | 0 | 0 |
| 5  | 1 | 1 | 1 | 1 | 1 | 0 | 0 | 0 | 0 | 0 | 0 | 0 |
| 6  | 1 | 1 | 1 | 1 | 1 | 1 | 0 | 0 | 0 | 0 | 0 | 0 |
| 7  | 1 | 1 | 1 | 1 | 1 | 1 | 1 | 0 | 0 | 0 | 0 | 0 |
| 8  | 1 | 1 | 1 | 1 | 1 | 1 | 1 | 1 | 0 | 0 | 0 | 0 |
| 9  | 1 | 1 | 1 | 1 | 1 | 1 | 1 | 1 | 1 | 0 | 0 | 0 |
| 10 | 1 | 1 | 1 | 1 | 1 | 1 | 1 | 1 | 1 | 1 | 0 | 0 |
| 11 | 1 | 1 | 1 | 1 | 1 | 1 | 1 | 1 | 1 | 1 | 1 | 0 |
| 12 | 1 | 1 | 1 | 1 | 1 | 1 | 1 | 1 | 1 | 1 | 1 | 1 |

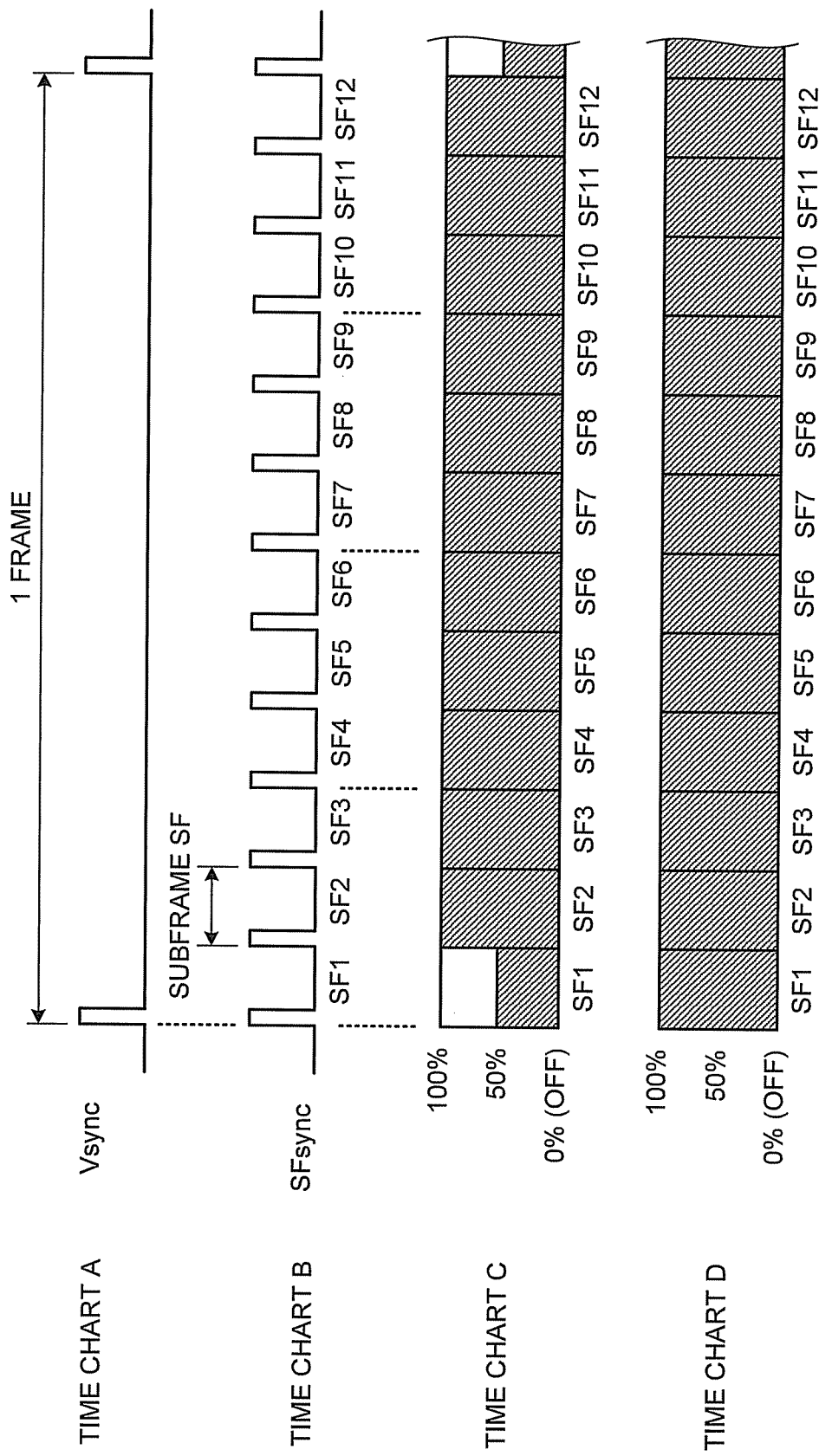

FIG.6

|  | $x_0$ | $x_1$ | $x_2$ | $x_3$ | $x_4$ |
|---|---|---|---|---|---|
| $y_0$ | 3 | 1 | 0 | 5 | 9 |
| $y_1$ | 1 | 2 | 4 | 6 | 10 |
| $y_2$ | 1 | 2 | 5 | 6 | 10 |
| $y_3$ | 2 | 3 | 8 | 5 | 9 |
| $y_4$ | 2 | 4 | 9 | 4 | 8 |

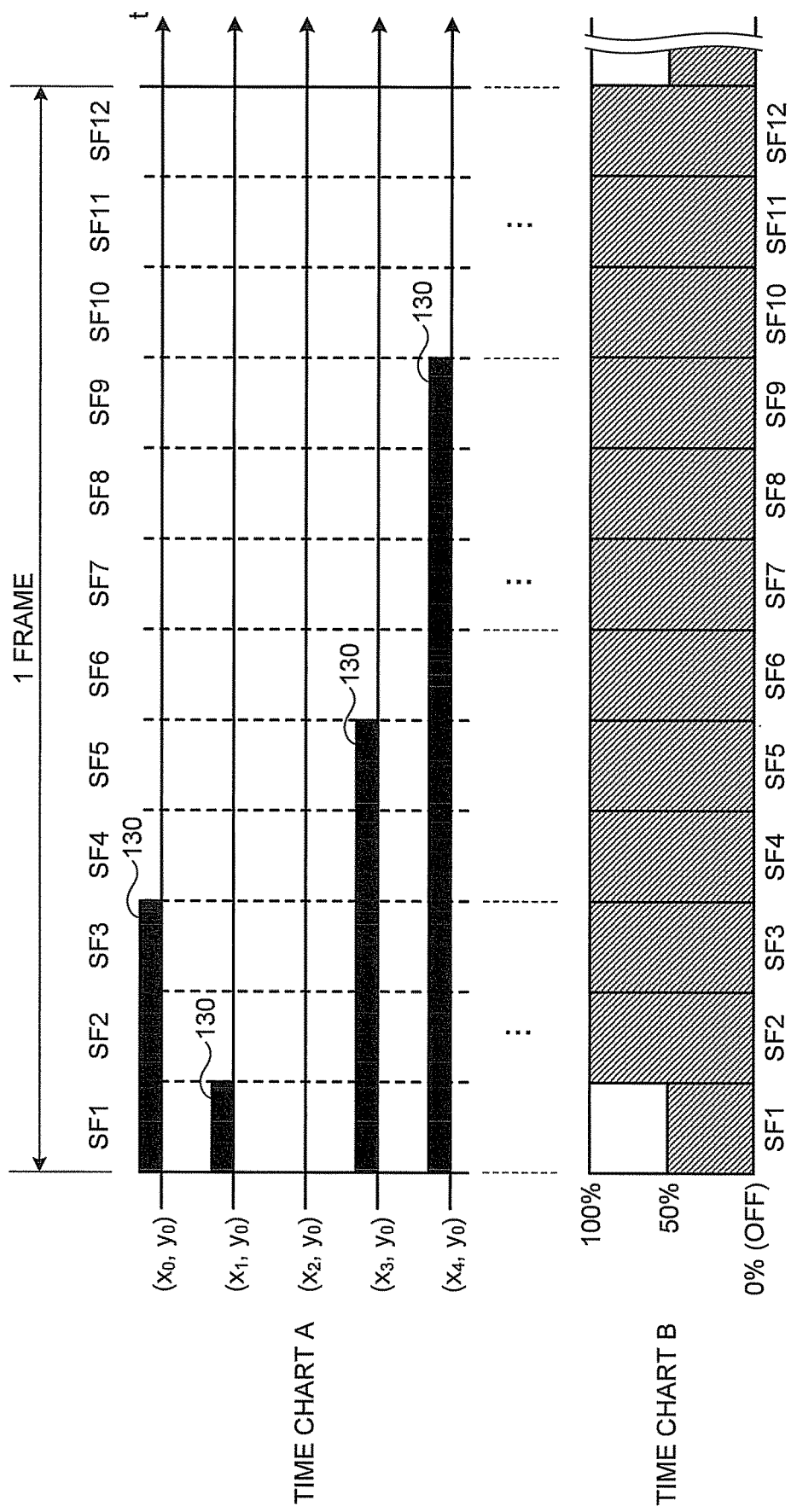

FIG.18

| SF \ GRADATION | SF1 | SF2 | SF3 | SF4 | SF5 | SF6 | SF7 | SF8 | SF9 | SF10 | SF11 | SF12 |
|---|---|---|---|---|---|---|---|---|---|---|---|---|
| 0 | 0 | 0 | 0 | 0 | 0 | 0 | 0 | 0 | 0 | 0 | 0 | 0 |
| 1 | 0 | 0 | 0 | 0 | 0 | 0 | 0 | 0 | 0 | 0 | 0 | 1 |
| 2 | 0 | 0 | 0 | 0 | 0 | 0 | 0 | 0 | 0 | 0 | 1 | 1 |
| 3 | 0 | 0 | 0 | 0 | 0 | 0 | 0 | 0 | 0 | 1 | 1 | 1 |
| 4 | 0 | 0 | 0 | 0 | 0 | 0 | 0 | 0 | 1 | 1 | 1 | 1 |
| 5 | 0 | 0 | 0 | 0 | 0 | 0 | 0 | 1 | 1 | 1 | 1 | 1 |
| 6 | 0 | 0 | 0 | 0 | 0 | 0 | 1 | 1 | 1 | 1 | 1 | 1 |
| 7 | 0 | 0 | 0 | 0 | 0 | 1 | 1 | 1 | 1 | 1 | 1 | 1 |
| 8 | 0 | 0 | 0 | 0 | 1 | 1 | 1 | 1 | 1 | 1 | 1 | 1 |
| 9 | 0 | 0 | 0 | 1 | 1 | 1 | 1 | 1 | 1 | 1 | 1 | 1 |
| 10 | 0 | 0 | 1 | 1 | 1 | 1 | 1 | 1 | 1 | 1 | 1 | 1 |
| 11 | 0 | 1 | 1 | 1 | 1 | 1 | 1 | 1 | 1 | 1 | 1 | 1 |
| 12 | 1 | 1 | 1 | 1 | 1 | 1 | 1 | 1 | 1 | 1 | 1 | 1 |

# LIGHT SOURCE DRIVE DEVICE, LIGHT SOURCE DRIVE METHOD, AND DISPLAY APPARATUS

CROSS-REFERENCE TO RELATED APPLICATION(S)

The present application claims priority to and incorporates by reference the entire contents of Japanese Patent Application No. 2015-094023 filed in Japan on May 1, 2015.

BACKGROUND OF THE INVENTION

1. Field of the Invention

The present invention relates to light source drive devices, light source drive methods, and display apparatus.

2. Description of the Related Art

As drive methods for driving liquid crystal display elements used in liquid crystal display apparatus, analog drive methods and digital drive methods are known. Analog drive methods are drive methods in which values of voltage applied to pixels are continuous analog values. Digital drive methods are drive methods in which the magnitude of voltage applied to pixels is binary, and the duration of applied voltage is changed according to the brightness (gradation) of images, thereby to control effective voltage values to be applied to liquid crystal pixels. Digital drive methods have the characteristics of being hardly affected by external factors such as noise since information applied to pixels is either "0" or "1".

A technique in digital drive methods to obtain halftones by time-division control of a frame of a video signal is known. For example, Japanese Laid-open Patent Publication No. 2013-092548 discloses a technique to equally divide a frame period of a video signal to form a plurality of subframes, select a subframe or subframes appropriately, according to gradations of the video signal to be displayed to perform display, and express halftones, utilizing human visual integration effect.

It is known that human reaction to gradations is not linear, and we react more sensitively to lower gradations (darker images). On the other hand, in the above-described drive method by gradation control using subframes, illuminance at each gradation is the sum of illuminance of subframes selected at the gradation. The relationship between voltage application time and the transmittance of a liquid crystal is not linear, and is similar to human reaction to gradations. There is a problem that it deviates greatly in a lower-gradation range, resulting in visually strange images.

SUMMARY OF THE INVENTION

It is an object of the present invention to at least partially solve the problems in the conventional technology.

According to one embodiment of the present invention, there is provided a light source drive device comprising: a divided period production unit that produces divided periods by dividing a frame period of a video signal; and a light source control unit that drives a light source for emitting light to a display element that is ON-OFF controlled on a pixel-by-pixel basis according to the video signal in accordance with the divided periods preassigned to each gradation, wherein the light source control unit controls a first light amount in a first divided period corresponding to a lowest gradation except black display to become a light amount lower than a second light amount in a second divided period other than the first divided period.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 3 is a diagram illustrating an example of the relationships between gradation values, subframes, and pixel ON/OFF control according to the first embodiment;

FIG. 5 is a time chart for explaining light source control according to the first embodiment;

FIG. 6 is a diagram illustrating an example of pixels of a display element;

FIG. 7 is a diagram illustrating an example of the relationship between the ON/OFF control of the pixels on the display element and light amount control on a light source according to the first embodiment;

FIG. 18 is a diagram illustrating an example of a drive gradation table applicable to the second embodiment.

DETAILED DESCRIPTION OF THE PREFERRED EMBODIMENTS

Figure 1:
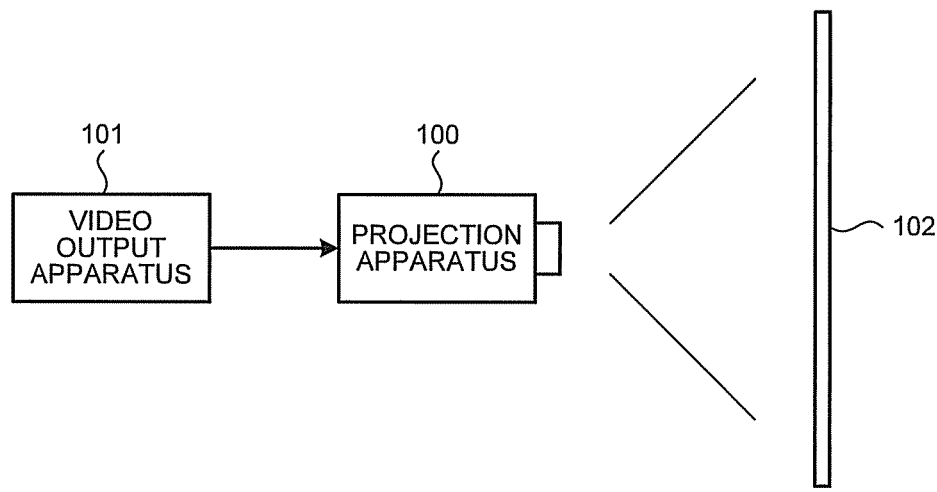
FIG. 1 is a diagram illustrating a configuration of an example of a display system applicable to embodiments.

Hereinafter with reference to the accompanying drawings, preferred embodiments of a light source drive device, a display apparatus, and a light source drive method will be described in detail. Specific numerical values, external configurations, and the like described in the embodiments are only illustrative to facilitate the understanding of the present invention, and are not intended to limit the present invention unless otherwise specified. Elements not directly related to the present invention will not be described in detail and shown in the drawings.

FIG. 1 is a diagram illustrating a configuration of an example of a display system applicable to each embodiment. In FIG. 1, a projection apparatus 100 as a display apparatus includes a light source and a display element. The projection apparatus 100 modulates light emitted from the light source by using the display element in accordance with a video signal supplied from a video output apparatus 101, and emits the light as projection light according to the video signal. The projection light emitted from the projection apparatus 100 is projected on a projection target medium 102, such as a screen, and is displayed on the projection target medium 102 as a projection video according to the video signal.

First Embodiment

Figure 2:
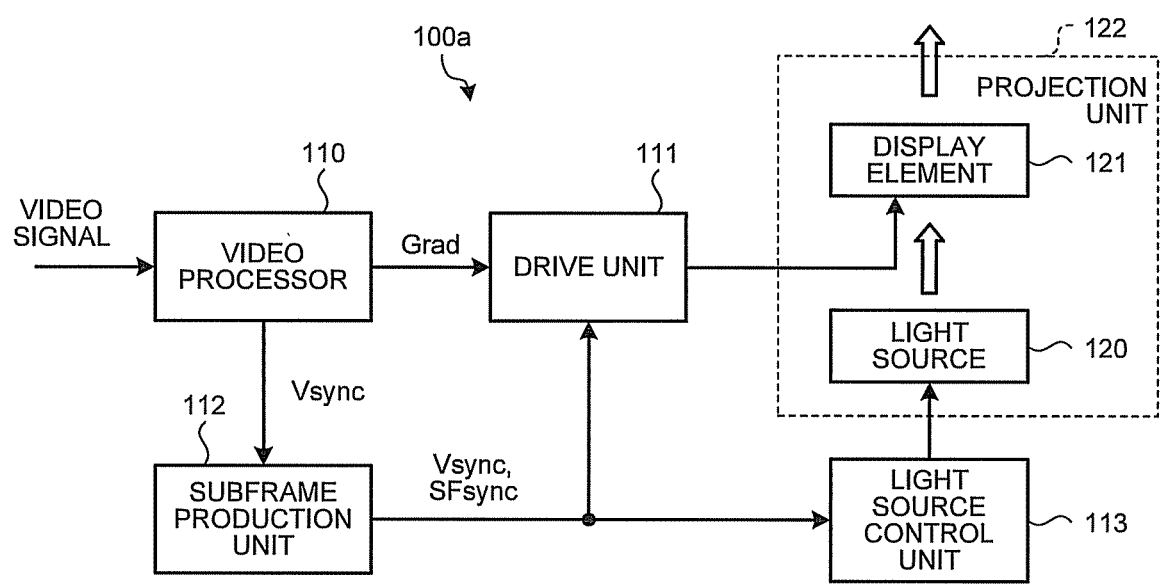
FIG. 2 is a block diagram schematically illustrating a configuration of an example of a projection apparatus according to a first embodiment.

A projection apparatus according to a first embodiment will be described. FIG. 2 schematically illustrates a configuration of an example of the projection apparatus according to the first embodiment. In FIG. 2, a projection apparatus 100a corresponding to the projection apparatus 100 in FIG. 1 includes a video processor 110, a drive unit 111, a subframe production unit 112 as a divided period production unit to create divided periods described below, a light source control unit 113, and a projection unit 122. The projection unit 122 includes a light source 120 and a display element 121. Here, a configuration formed by the subframe production unit 112 and the light source control unit 113 is referred to as a light source drive device.

A video signal is input into the video processor 110. Here, the video signal is a digital video signal for displaying a moving image with a frame image updated in a predetermined frame cycle (for example, 60 frames per second). The video signal is not limited to this example, and for example, the video processor 110 may convert an analog video signal into a digital video signal. For purposes of description, the video signal can represent 13-level gradation from a gradation value "0" to gradation value "12" for each of the pixels. Here, the gradation value "0" and gradation value "12" correspond to black display and white display, respectively, and the gradation value "1" through gradation value "11" correspond to halftone display of brightness according to the gradation value.

The video processor 110 extracts a frame synchronization signal Vsync indicating a front of a frame, and gradation information Grad of each pixel from the input video signal. The gradation information Grad includes the gradation value (luminance value) of a pixel. The video processor 110 supplies the extracted gradation information Grad to the drive unit 111. In addition, the video processor 110 supplies the extracted frame synchronization signal Vsync to the subframe production unit 112.

The subframe production unit 112 produces obtained through equal division of a one-frame period in accordance with the frame synchronization signal Vsync supplied from the video processor 110. The subframe production unit 112 equally divides one frame period by a number of divisions corresponding to a number of gradations of the video signal, for example, to create divided periods. The divided periods are hereinafter referred to as subframes.

In this example where a video signal can represent thirteen gradations, the subframe production unit 112 divides one frame period into twelve subframes SF1, SF2, ..., SF12, less than the number of gradations by 1. This is because an OFF state or an ON state of a pixel can be maintained in a frame period at gradation value "0" or gradation value "12", details of which will be described below.

The subframe production unit 112 generates, for example, a subframe synchronization signal SFsync that indicates timing of the divided each subframe SF1, SF2, ..., SF12, and then outputs the generated subframe synchronization signal SFsync together with the frame synchronization signal Vsync. The frame synchronization signal Vsync and subframe synchronization signal SFsync that are output from the subframe production unit 112 are supplied to each of the drive unit 111 and the light source control unit 113.

The light source control unit 113 generates a light source control signal for controlling light emission of the light source 120, based on the frame synchronization signal Vsync and the subframe synchronization signal SFsync provided from the subframe production unit 112. The light source 120 is a semiconductor laser, for example, and is controlled in the emission of laser light according to the light source control signal provided from the light source control unit 113. For example, the light source 120 is controlled in at least the intensity (brightness) of laser light to be emitted, according to the light source control signal. The light source 120 is configured to be controllable in light emission timing in at least units of the above-described subframes, according to the light source control signal. Details of the light emission control on the light source 120 by the light source control unit 113 will be described below.

The light source 120 may be a different type of light source if the light emission intensity can be controlled according to a light source control signal, and the light emission timing can be controlled in units of subframes. For example, as a light source, a light emitting diode (LED) may be used, or an ultra-high performance (UHP) lamp may be used.

Meanwhile, the drive unit 111 generates a driving signal for driving the display element 121 in accordance with the gradation information Grad for each pixel supplied from the video processor 110, and the frame synchronization signal Vsync and subframe synchronization signal SFsync supplied from the subframe production unit 112. The driving signal is supplied to the display element 121.

The display element 121 includes pixels arranged in a matrix, and modulates and emits light incident from the light source 120 for each pixel in accordance with the driving signal supplied from the drive unit 111, based on the video signal. According to the first embodiment, a liquid crystal display element using characteristics of a liquid crystal is used as the display element 121. The liquid crystal display element includes a liquid crystal inserted between a pixel electrode for each pixel and a common electrode common to respective pixels. The liquid crystal display element displays a video by changing transmittance of the liquid crystal to light of a specific polarization direction, through application of a voltage to each pixel according to the video signal by the pixel electrode.

According to the first embodiment, a reflective liquid crystal display element is used as the display element 121. In the reflective liquid crystal display element, light emitted on an incident plane travels through a liquid crystal layer from the incident plane, is emitted on a reflection plane, is reflected by the reflection plane, travels through the liquid crystal layer again, and is emitted from the incident plane to outside. In order to change a polarization state of the incident light for emission, polarization separation of the incident light and emitted light are performed by using a polarization beam splitter and the like by the reflective liquid crystal display element.

In the projection apparatus 100a, the projection unit 122 includes the light source 120 and the display element 121. A projected image projected onto the projection target medium 102 has integrated characteristics of the characteristics of the light source 120 and the characteristics of the display element 121 included in the projection unit 122. Hereinafter, the integrated characteristics of the characteristics of the light source 120 and the characteristics of the display element 121 are taken as the characteristics of the projection unit 122. A drive signal input to the display element 121 is taken as an input to the projection unit 122, and light of the light source 120 emitted via the display element 121 is taken as an output of the projection unit 122.

Next, the digital drive method according to the first embodiment will be described in more detail. In the first embodiment, the drive unit 111 drives the display element 121 by the digital drive method. Under the digital drive scheme according to the first embodiment, the drive unit 111 controls each pixel in two states, an ON state and an OFF state. Here, the ON state is, for example, a state where transmittance of a liquid crystal is highest, and is a state where incidence of white light to a liquid crystal produces display of approximate white (white display). Meanwhile, the OFF state is, for example, a state where transmittance of a liquid crystal is lowest, and is a state where incidence of white light to a liquid crystal produces display of approximate black (black display). The drive unit 111 expresses a gradation on a pixel by controlling the pixel to the ON state in a subframe or subframes in a frame period, corresponding in number to the gradation value of the pixel, and controlling the pixel to the OFF state in the other subframes.

FIG. 3 illustrates an example of the relationship between the gradation value and the ON/OFF control on the pixels according to the first embodiment. In FIG. 3, each column is the subframe SF1, SF2, . . . , SF12 from left to right. Among these subframes, the subframe SF1 is a front subframe of the frame period, and the subframe SF12 is a rear-end subframe of the frame period. In addition, in FIG. 3, the gradation value increases by 1 from 0 in each row from top to bottom. The gradation value "0" is the lowest (darkest) gradation, and the gradation value "12" is the highest (brightest) gradation.

In the first embodiment, the drive unit 111 selects the consecutive subframes the number of which depends on the gradation value of the pixel from the front end of the frame period, and controls the pixel to an ON state in the selected subframes. In FIG. 3, a cell with a value "1" illustrated by hatching represents that the pixel is controlled to an ON state, while a cell with a value "0" represents that the pixel is controlled to an OFF state.

For example, when the gradation value of a certain pixel is "3", the drive unit 111 selects three subframes from the front subframe SF1 of the frame period (subframes SF1, SF2, and SF3). The drive unit 111 then controls the pixel to an ON state in the selected subframes. Meanwhile, the drive unit 111 controls the pixel to an OFF state in other nine subframes (subframes SF4 to SF12).

For example, when the gradation value of a certain pixel is "12", the drive unit 111 selects 12 subframes from the front subframe SF1 of the frame period (subframes SF1 to SF12). The drive unit 111 then controls the pixel to an ON state in the selected subframes. In this case, there exists no subframe to be controlled to an OFF state.

Furthermore, for example, when the gradation value of a certain pixel is "0", the drive unit 111 controls the pixel to an OFF state in all the subframes (subframes SF1 to SF12) within the one-frame period. In this case, there exists no subframe to be controlled to an ON state.

Thus, in the first embodiment, the subframes to undergo ON control and OFF control are allocated in advance for each gradation. At gradation value "0", the OFF state of a pixel is maintained in the frame period, and at gradation value "12", the ON state of a pixel is maintained in the frame period. Thus, since the gradations of gradation value "0" and gradation value "12" can be realized by controlling all the subframes in the frame period to the OFF state or to the ON state, twelve subframes in a frame period are sufficient in number.

Here, the characteristics of the projection unit 122 will be described. Generally, the input-output characteristic of a display is not linear, and output is represented by a downward convex curve with respect to input. Therefore, video signal processing is performed according to this input-output characteristic. As a curve representing the input-output characteristic of a display, a gamma curve of gamma value γ=2.2, for example, is typically used. A gamma curve is expressed by $V_{OUT}=V_{IN}^{\gamma}$, where $V_{IN}$ is an input value and $V_{OUT}$ is an output value.

By providing a video signal corrected according to a gamma curve of gamma value 1/γ, for example, to a display with the input-output characteristic of gamma value γ, a linear gradation expression can be obtained. For example, a video signal output from the video output apparatus 101 typically has a gradation characteristic corrected based on a gamma curve of gamma value 1/γ 0.455 with respect to a linear gradation characteristic.

The characteristics of the projection unit 122 having the display element 121 using the liquid crystal are also not linear in the input-output characteristic, and output is represented by a downward convex curve with respect to input like the display input-output characteristic. For example, an input to the projection unit 122 corresponds to the gradation value of a video signal. In the first embodiment, as described with reference to FIG. 3, the gradation value corresponds to the time of voltage application to the liquid crystal layer. An output of the projection unit 122 is based on the light amount of the light source 120 and the transmittance of the liquid crystal. More specifically, an output of the projection unit 122 corresponds to the brightness on the projection target medium 102 when light from the light source 120 is projected onto the projection target medium 102 via the display element 121.

Figure 4A:
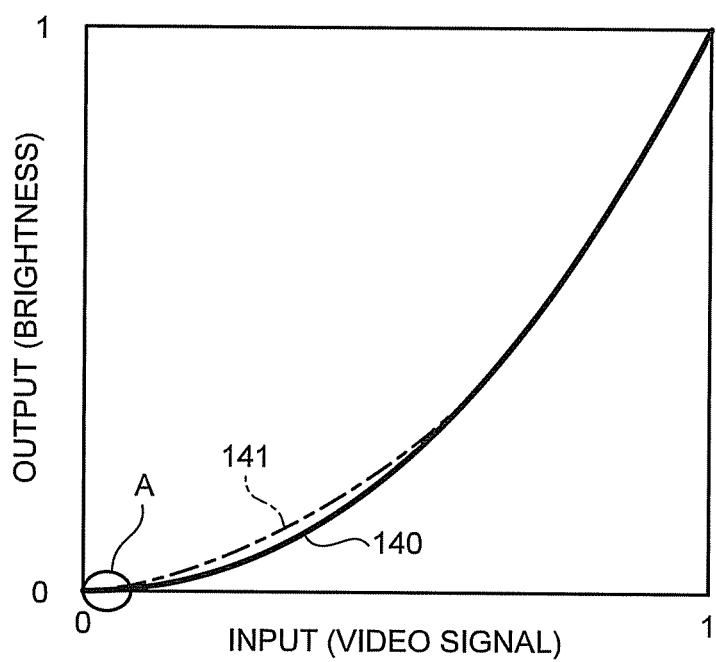
FIGS. 4A and 4B are graphs illustrating in comparison a gamma curve of γ=2.2 and an example of the input-output characteristic of a projection unit.
Figure 4B:
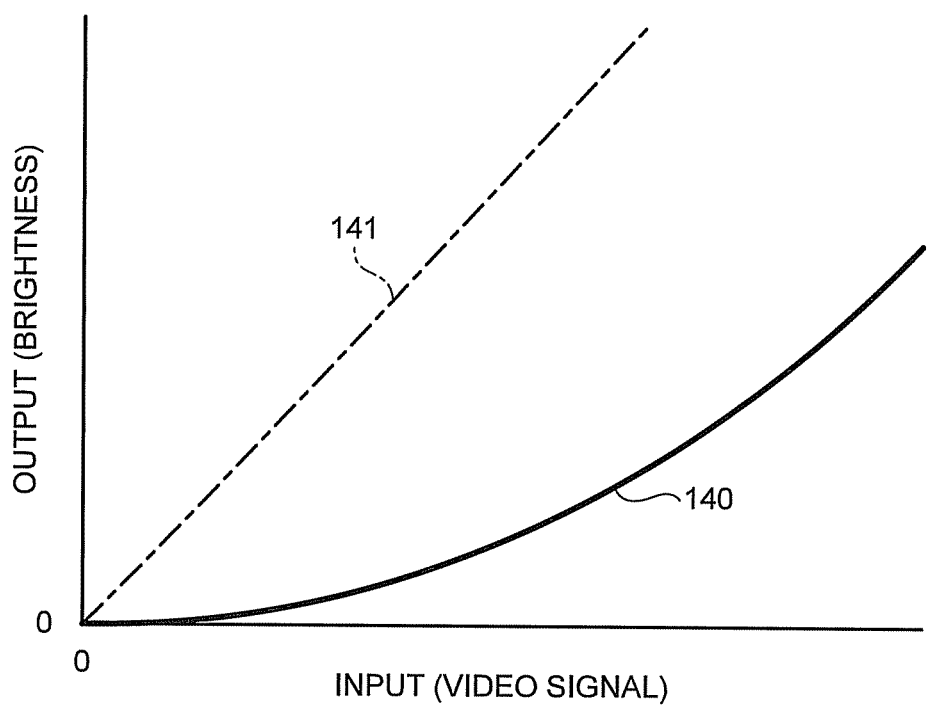

With an input-output characteristic according to the gamma curve of γ=2.2 as a reference characteristic, FIGS. 4A and 4B illustrate in comparison the reference characteristic and an example of the input-output characteristic of the projection unit 122. In FIG. 4A, the horizontal axis represents input, that is, a video signal, with a maximum value normalized to one. In the above-described example, as for input, value "1" corresponds to gradation value "12". In FIG. 4A, the vertical axis represents output, that is, brightness, with a maximum value normalized to one. The brightness is the brightness on the projection target medium 102 described above when light from the light source 120 is projected onto the projection target medium 102 via the display element 121. In the example in FIG. 4A, assume that the light amount of the light source 120 is controlled to be constant.

FIG. 4B is an example where a portion indicated by a range A in FIG. 4A is enlarged. In FIGS. 4A and 4B, a characteristic line 140 represents the reference characteristic (characteristic according to the gamma curve of γ=2.2), and a characteristic line 141 represents the input-output characteristic of the display element 121, respectively.

As illustrated in FIG. 4A, in a range of higher input values such as input values ≥0.5 (gradation value "7" and more), the characteristic line 140 and the characteristic line 141 substantially agree, and the input-output characteristic of the projection unit 122 can be regarded as being substantially equal to the reference characteristic.

On the other hand, in a range of lower input values such as input values <0.5 (gradation value "6" and less), the characteristic line 140 and the characteristic line 141 do not agree, and the input-output characteristic of the projection unit 122 deviates to the higher output (brightness) side with respect to the reference characteristic. In the range A including the lowest input value in FIG. 4A, also, as shown in FIG. 4B, the input-output characteristic of the projection unit 122 deviates to the higher output (brightness) side with respect to the reference characteristic.

When the projection unit 122 is driven with the input-output characteristic according to the characteristic line 141, as for display of an image of a video signal having an input value in a range of higher gradation values, that is, a range in which the characteristic line 141 and the characteristic line 140 substantially agree, intended display is considered to be substantially obtained. On the other hand, as for display of an image of a video signal having an input value in a range of lower gradation values, that is, a range in which the characteristic line 141 deviates to the higher output side with respect to the characteristic line 140, the image is displayed brighter than an intended image. This can be a factor for the degradation of the display quality in a darker image area in an image of a video signal.

Thus, in the first embodiment, by controlling the light amount of the light source 120 in a frame period, the input-output characteristic of the projection unit 122 is brought closer to the reference characteristic, for example. More specifically, in the first embodiment, the light amount of the light source 120 is controlled in units of subframes, and the light amount of the light source 120 is controlled so that a first light amount in a first subframe corresponding to the lowest gradation except black display (gradation value "0") included in the subframes SF1 to SF12 is a light amount lower than a second light amount in a second subframe other than the first subframe.

With reference to a time chart in FIG. 5, the light source control according to the first embodiment will be described in more detail. In FIG. 5, time progresses in the right direction. TIME CHART A in FIG. 5 illustrates an example of the frame synchronization signal Vsync indicating a frame period. A frame period is from the rising edge of a signal to the next rising edge.

TIME CHART B in FIG. 5 illustrates an example of the subframe synchronization signal SFsync indicating subframe periods. Like the frame synchronization signal Vsync, the subframe synchronization signal SFsync has a subframe period from the rising edge of a signal to the next rising edge. In the example in TIME CHART B in FIG. 5, in accordance with FIG. 3 described above, a frame period is divided into twelve subframes SF1 to SF12 in the time axis direction.

TIME CHART D in FIG. 5 illustrates an example of light amount control on the light source 120 by an existing art. In the existing art, as illustrated by hatch lines in TIME CHART D in FIG. 5, the light amount of the light source 120 is controlled to a uniform light amount in all the subframes SF1 to SF12. The light amount of the light source 120 in each of the subframes SF1 to SF12 at this time is taken as a 100% light amount. The characteristic line 141 in FIG. 4 described above corresponds to this existing art.

TIME CHART C in FIG. 5 illustrates an example of the light amount control on the light source 120 according to the first embodiment. In the first embodiment, the light source control unit 113 performs control to reduce the light amount of the light source 120 at a reduction ratio of 50%, for example, in the subframe SF1 at the front of the frame period, and controls the light amount of the light source 120 to the 100% light amount in the other subframes SF2 to SF12. The subframe SF1 is a subframe in which, as illustrated in FIG. 3 described above, a pixel is ON-controlled at the lowest gradation except black display (gradation value "0"). Thus, in the subframe SF1, a pixel is ON-controlled at all the gradations except the gradation of gradation value "0".

Control of the projection unit 122 according to the first embodiment will be more specifically described with reference to FIGS. 6 and 7. FIG. 6 illustrates an example of each pixel of the display element 121. For description here, FIG. 6 illustrates the display element 121 including five pixels by five pixels, and illustrate each pixel in coordinates $(x_n, y_n)$. A numerical value within each cell of FIG. 6 illustrates an example of the gradation value of each pixel according to the video signal.

FIG. 7 illustrates an example of a relationship between on/off control of each pixel in the display element 121 and light emission control of the light source 120 according to the first embodiment. In FIG. 7, time passes rightward.

TIME CHART A in FIG. 7 illustrates ON intervals 130 in which pixels are controlled to the ON state, on five pixels at coordinates $(x_0, y_0)$ to $(x_4, y_0)$ in the example in FIG. 6. Referring to FIG. 6, the drive unit 111 sets, for the pixel $(x_0, y_0)$, the subframes SF1 to SF3 as the ON interval 130 for a gradation value of "3", and sets, for the pixel $(x_1, y_0)$, only the subframe SF1 as the ON interval 130 for a gradation value of "1". For the pixel $(x_2, y_0)$, the drive unit 111 does not set an ON interval 130 since the gradation value is "0". For the pixel $(x_3, y_0)$ and the pixel $(x_4, y_0)$, the drive unit 111 sets the subframes SF1 to SF5 and the subframes SF1 to SF9 as the ON intervals 130, respectively, since the gradation values are "5" and "9", respectively.

TIME CHART B in FIG. 7 illustrates an example of the light amount control on the light source 120. In this example, as in TIME CHART C in FIG. 5, the light source control unit 113 controls the light source 120 to reduce the light amount at a reduction ratio of 50% in the subframe SF1, and controls the light source 120 to the 100% light amount in the other subframes SF2 to SF12. Therefore, the pixels $(x_0, y_0)$, $(x_1, y_0)$, $(x_3, y_0)$, and $(x_4, y_0)$ have 50% brightness (light amount) in the subframe SF1. Then, the pixels $(x_0, y_0)$, $(x_3, y_0)$, and $(x_4, y_0)$ have 100% brightness (light amount) in the subframe SF2 and thereafter.

Therefore, the pixels $(x_0, y_0)$, $(x_1, y_0)$, $(x_3, y_0)$, and $(x_4, y_0)$ except the pixel $(x_2, y_0)$ of black display are reduced in brightness (light amount) by the amount of reduction of the light amount at a reduction ratio of 50% in the subframe SF1, compared to the case illustrated in TIME CHART D in FIG. 5 where the light amount of the light source 120 is controlled to a uniform light amount in all the subframes SF1 to SF12.

For example, suppose that the light amounts of the light source 120 in the subframes are simply added on each pixel, with brightness when the light amount of the light source 120 is 100% being normalized to "1". In this case, by the light source control according to the first embodiment, the brightness (light amount) of the pixels ($x_0$, $y_0$), ($x_1$, $y_0$), ($x_3$, $y_0$), and ($x_4$, $y_0$) is "2.5", "0.5", "4.5", and "8.5", respectively. By contrast, by the existing art that sets the light amount of the light source in the subframes SF1 to SF12 uniform, the brightness (light amount) of the pixels ($x_0$, $y_0$), ($x_1$, $y_0$), ($x_3$, $y_0$) and ($x_4$, $y_0$) is "3", "1", "5", and "9", respectively.

The comparison of the brightness (light amount) of each pixel between the case where the light amount control according to the first embodiment is performed and the existing art shows that the ratio between them increases as gradation lowers except for black display.

Figure 8A:
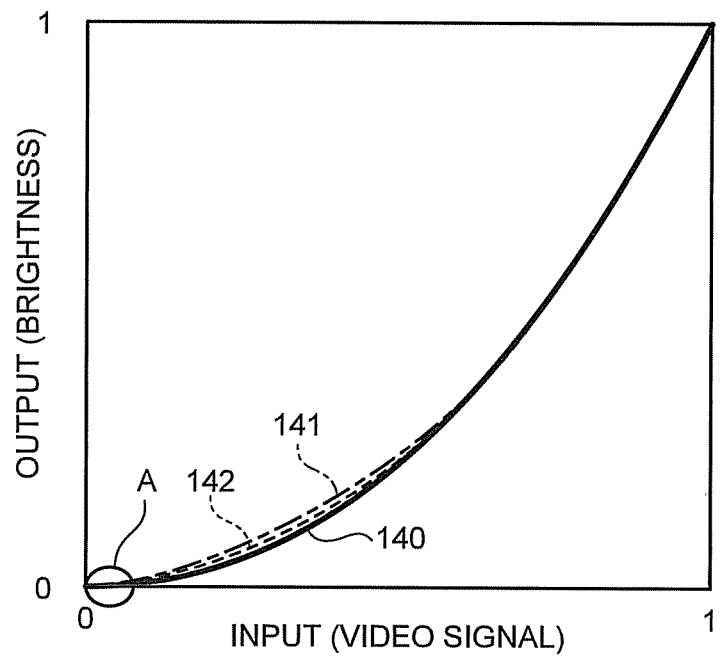
FIGS. 8A and 8B are graphs for explaining an effect when the light source control according to the first embodiment is performed.
Figure 8B:
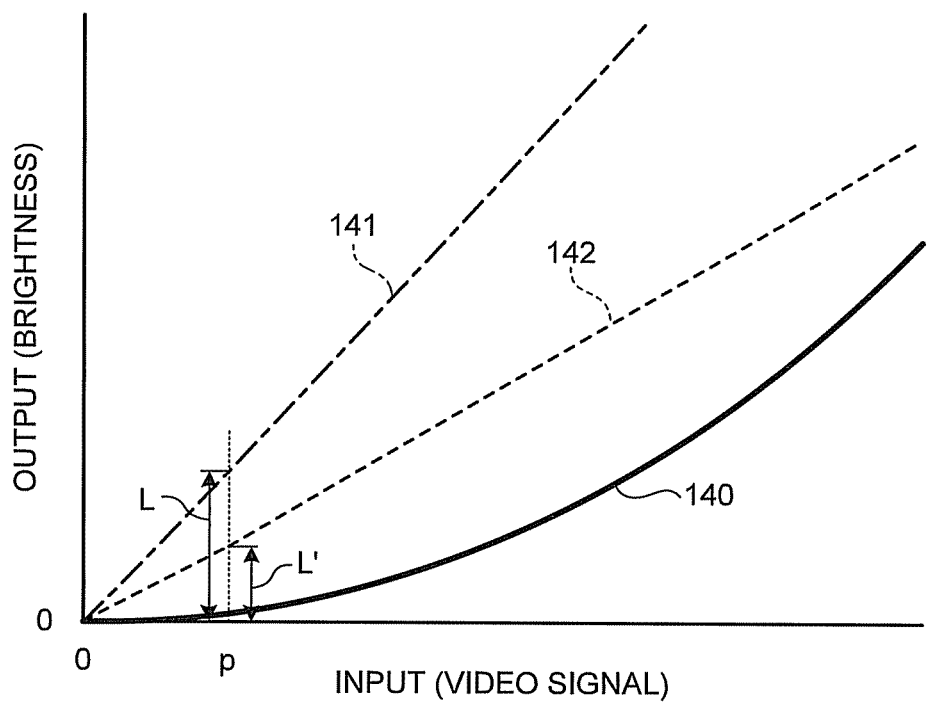

With reference to FIGS. 8A and 8B, effects when the light source control according to the first embodiment is performed will be described. In FIGS. 8A and 8B, portions identical to those in FIGS. 4A and 4B described above are denoted by the same reference numerals, and will not be described in detail. FIGS. 8A and 8B respectively correspond to FIGS. 4A and 4B described above with the addition of a characteristic line 142 indicating an example of the input-output characteristic of the projection unit 122 when the light source control according to the first embodiment is performed.

In an example in FIGS. 8A and 8B, the light amount of the light source 120 is controlled to 50% in the subframe SF1, and to 100% in the other subframes SF2 to SF12, respectively. It is found that by this control, in a range of lower input values such as input values <0.5 (gradation value "6" and less), the characteristic line 142 according to the first embodiment is brought closer to the characteristic line 140, that is, the reference characteristic, compared to the characteristic line 141 by the existing art. On the other hand, in a range of higher input values such as input values ≥0.5 (gradation value "7" and more), the characteristic line 142 substantially agrees with the characteristic line 140 as in the existing art.

Therefore, by performing the light source control according to the first embodiment, the display of an image according to a video signal of an input value in a lower gradation range can be brought closer to an intended image than that in the existing art, improving the display quality compared to the existing art.

The minimum resolution of an output value can be expressed by an output value at a unit input value. Consider minimum resolution L in the existing art and minimum resolution L' when the light amount control according to the first embodiment is performed, at input value p as illustrated in FIG. 8B. In this case, when light amount a in the subframe SF1 is set at "0≤a≤1", and light amount b in the other subframes SF2 to SF12 at "1", minimum resolution L' can be expressed by L'=a×L.

Here, when "0≤a/b≤1", minimum resolution L'(n) at gradation value n is expressed by the following expression (1). In expression (1), n>0. Value n indicating the order of the subframes SF corresponds to the gradation value.

Expression 1;

$$L'(n) = b \times n - (b-a)/b \times n \times L(n) \tag{1}$$

Figure 9:
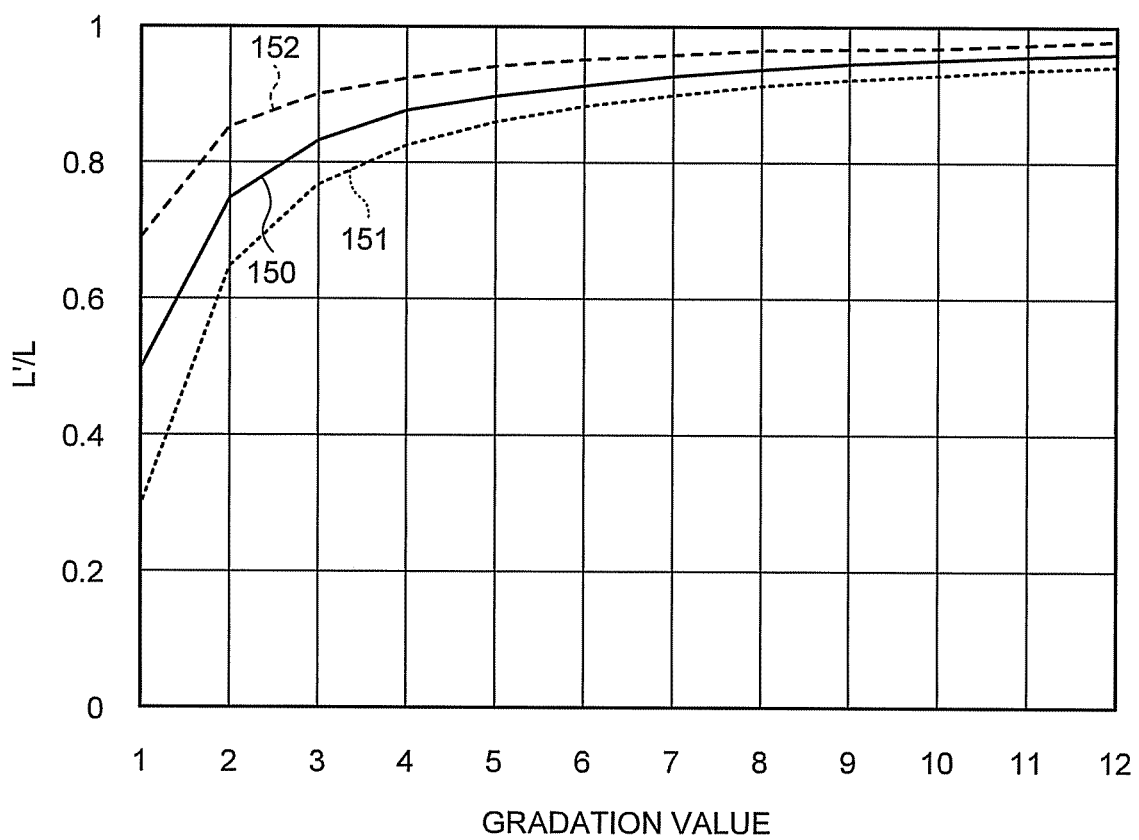
FIG. 9 is a graph illustrating an example of variations of minimum resolutions at each gradation value n according to the first embodiment.

FIG. 9 illustrates an example of variations of minimum resolutions calculated based on expression (1) at each gradation value n, according to the first embodiment. In FIG. 9, the vertical axis represents ratio L'/L between minimum resolution L' according to the first embodiment and minimum resolution L according to the existing art, and the horizontal axis represents gradation value n. A characteristic line 150 represents an example where "a=0.5, b=1", a characteristic line 151 an example where "a=0.3, b=1", and a characteristic line 152 an example where "a=0.7, b=1", respectively.

As shown in FIG. 9, the larger gradation value n, the closer the values of ratio L'/L to "1", and the smaller gradation value n, the smaller the values of ratio L'/L. At gradation value n less than a predetermined value (e.g., less than gradation values "4" to "5"), the degree of variation in the values of ratio L'/L with respect to gradation value n increases. Therefore, in a range where the value of gradation value n is less than a predetermined value, for example, in a range of "1≤n≤4 to 5", the minimum resolution becomes still smaller, allowing an improvement in the display quality in dark image areas.

As indicated by the characteristic lines 150, 151, and 152, the degree of variation of ratio L'/L differs depending on value a/b. Therefore, by fixing light amount b to "1" and adjusting light amount a between 0≤a≤1 at the light source control unit 113, for example, more appropriate control can be performed. For example, it is considered to change value a according to the characteristics of the light source 120 and the display element 121.

Modification of First Embodiment

Next, a modification of the first embodiment will be described. In the above-described first embodiment, control is performed to reduce the light amount of the light source 120 only in the single subframe SF1 corresponding to the lowest gradation value except black display (gradation value "0"), out of the subframes SF1 to SF12 produced by dividing the frame period. By contrast, in the modification of the first embodiment, the light amount of the light source 120 is reduced in a plurality of subframes SF.

Figure 10:
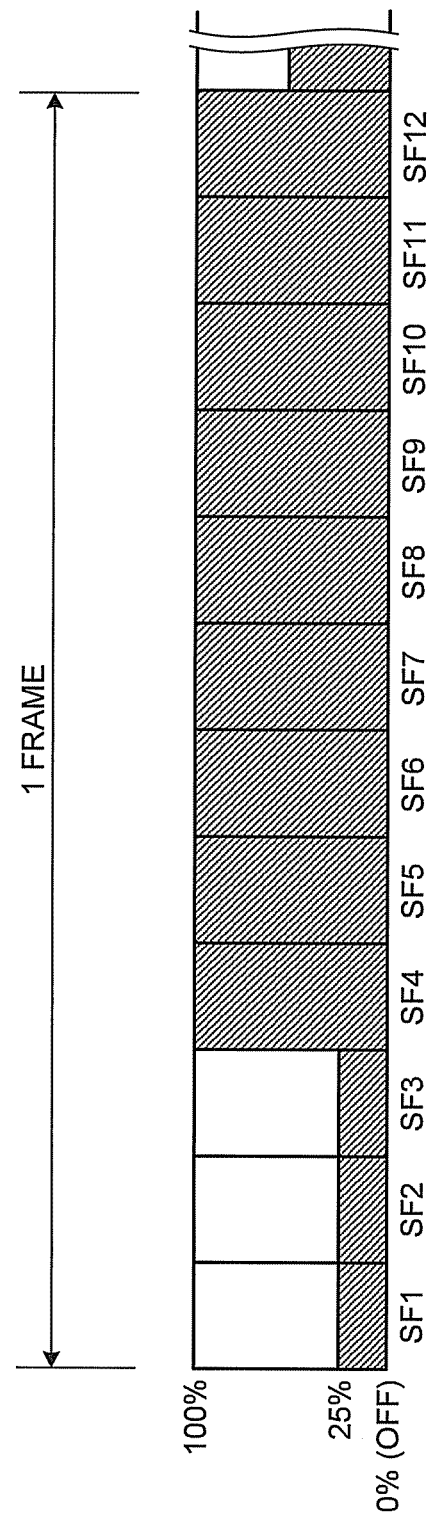
FIG. 10 is a diagram illustrating an example of light source control according to a modification of the first embodiment.

FIG. 10 illustrates an example of control on the light source 120 according to the modification of the first embodiment. In the example in FIG. 10, the light source control unit 113 performs control to reduce the light amount of the light source 120 in three subframes SF, the subframe SF1 corresponding to the lowest gradation value except black display, and the subframes SF2 and SF3 temporally continuous with the subframe SF1, out of the subframes SF1 to SF12 produced by dividing the frame period.

The degree of reduction of the light amount in the subframes SF1 to SF3 is determined so as to bring the input-output characteristic of the projection unit 122 closer to the reference characteristic. In the example in FIG. 10, the light amount of the light source 120 is controlled to be reduced uniformly at a reduction ratio of 25% in the subframes SF1 to SF3, which is not limited to this example. For example, the reduction ratio of the light amount of the light source 120 is not limited to 25%. Alternatively, for example, the light amount of the light source 120 may be reduced at different reduction ratios in the subframes SF1 to SF3.

Further, in the above description, the subframe production unit 112 produces subframes SF by dividing a frame period equally, which is not limited to this example. Specifically, the subframe production unit 112 may cause the subframes SF to have different lengths.

Second Embodiment

Figure 11:
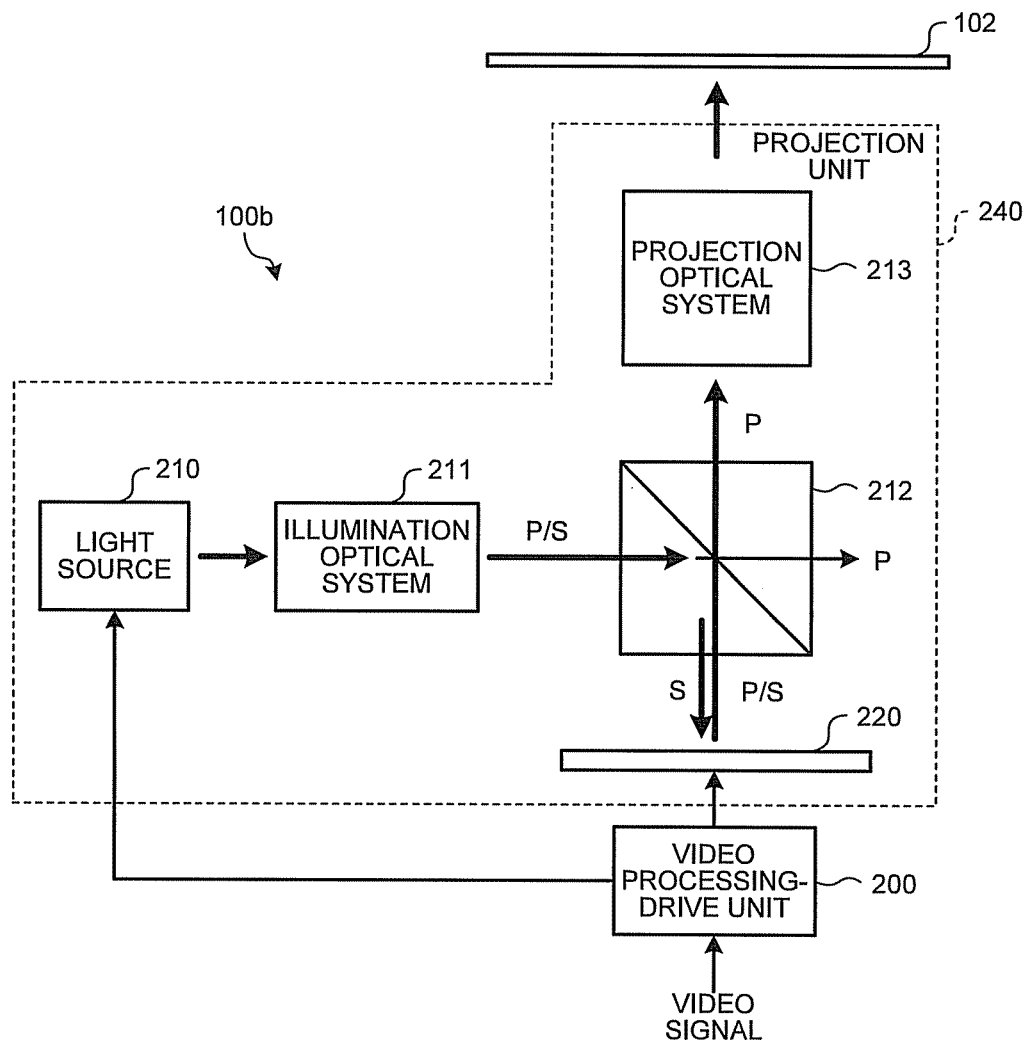
FIG. 11 is a diagram illustrating a configuration of an example of a projection apparatus according to a second embodiment.

Next, a second embodiment will be described. FIG. 11 illustrates a configuration of an example of a projection apparatus 100b according to the second embodiment, corresponding to the projection apparatus 100 of FIG. 1. The projection apparatus 100b includes a video processing and drive unit 200 and a projection unit 240. The projection unit 240 includes a light source 210, an illumination optical system 211, a polarization separator 212, a projection optical system 213, and a display element 220.

The video processing and drive unit 200 generates, for example, a light source control signal for controlling the light source 210, and a driving signal for driving the display element 220 based on a video signal supplied from a video output apparatus 101.

The light source 210 corresponds to the light source 120 of FIG. 2, and for example, a semiconductor laser is used. Light emitted from the light source 210 travels through the illumination optical system 211, and is incident in the optical isolator 212. The light incident in the optical isolator 212 from the illumination optical system 211 is light including P-polarized light and S-polarized light.

The polarization separator 212 includes a polarization separating plane for separating the P-polarized light and the S-polarized light included in the light, and the polarization separating plane transmits the P-polarized light and reflects the S-polarized light. As the polarization separator 212, a polarizing beam splitter can be used. The light incident in the polarization separator 212 from the illumination optical system 211 is separated into the P-polarized light and the S-polarized light by the polarization separating plane. The P-polarized light passes through the polarization separating plane, and the S-polarized light is reflected by the polarization separating plane, and is emitted on the display element 220.

Figure 12:
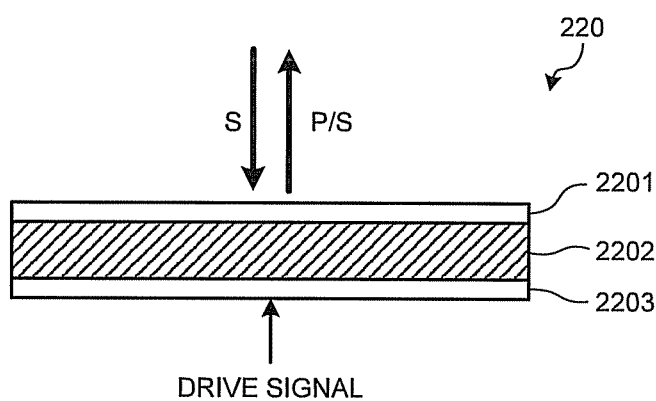
FIG. 12 is a diagram illustrating a configuration example of a display element by a cross section in a direction parallel to a light incident direction.

The display element 220 corresponds to the display element 121 of FIG. 2, and for example, the display element 220 is a reflective liquid crystal display element. FIG. 12 illustrates an example of a configuration of the display element 220 in a cross section of a direction parallel to an incident direction of light. The display element 220 includes a counter electrode 2201, a pixel electrode unit 2203 including a pixel electrode and a pixel circuit that drives the pixel electrode, and a liquid crystal layer 2202. The display element 220 is constructed to have the liquid crystal layer 2202 inserted between the counter electrode 2201 and the pixel electrode of the pixel electrode unit 2203. In the display element 220, a voltage is applied to the liquid crystal layer 2202 between the pixel electrode and the opposite electrode 2201 in response to the driving signal supplied to the pixel circuit.

The S-polarized light incident on the display element 220 travels through the counter electrode 2201 and the liquid crystal layer 2202, and is incident on the pixel electrode unit 2203. The S-polarized light is then reflected by the pixel electrode unit 2203, travels through the liquid crystal layer 2202 and the counter electrode 2201 again, and is emitted from the display element 220. At this time, the liquid crystal layer 2202 modulates the S-polarized light that is incident and reflected in accordance with the voltage applied between the counter electrode 2201 and the pixel electrode of the pixel electrode unit 2203 in response to the driving signal. The S-polarized light incident on the counter electrode 2201 is modulated during a process of reflection by the pixel electrode unit 2203 and emission from the counter electrode 2201. The S-polarized light is then emitted from the counter electrode 2201 as light including the P-polarized light and the S-polarized light.

Figure 13:
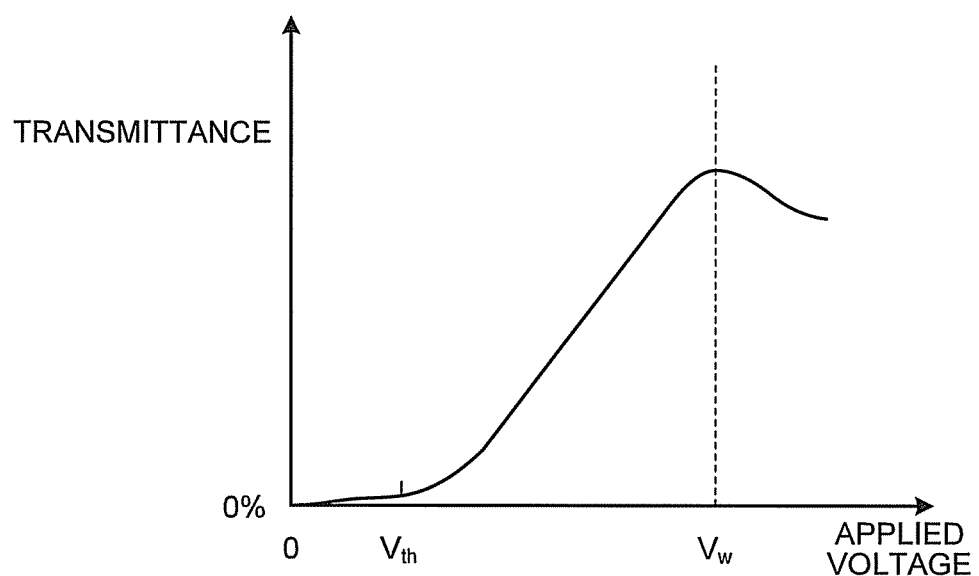
FIG. 13 is a graph illustrating an example of a characteristic of the display element.

FIG. 13 illustrates an example of characteristics of the display element 220. In FIG. 13, a horizontal axis represents an applied voltage applied to the liquid crystal layer 2202 by the pixel electrode and the counter electrode 2201. A vertical axis represents transmittance of the liquid crystal layer 2202. Intensity of light emitted from the display element 220 depends on the transmittance of the liquid crystal layer 2202. When the applied voltage is 0 V, the transmittance of the liquid crystal layer 2202 is approximately 0%, and the liquid crystal layer 2202 is in an OFF state. As the applied voltage increases, the transmittance will increase gradually, and when the applied voltage exceeds a threshold voltage $V_{th}$, the transmittance will increase rapidly. The transmittance is saturated at a saturation voltage $V_w$. This saturation voltage $V_w$ is a white-level voltage. The display element 220 makes a display, for example, using the transmittance between 0 V and the saturation voltage $V_w$.

Returning to FIG. 12, the light including the P-polarized light and the S-polarized light emitted from the display element 220 is incident in the polarization separator 212. The S-polarized light is reflected by the polarization separating plane, and the P-polarized light passes through the polarization separating plane. The P-polarized light that passes through the polarization separating plane is emitted from the polarization separator 212, is incident into the projection optical system 213, and is emitted from the projection apparatus 100b as projection light. The projection light emitted from the projection apparatus 100b is projected on a projection target medium 102, and the projection video is displayed on the projection target medium 102.

In the second embodiment, assume that, like the input-output characteristic of the projection unit 122 in the above-described first embodiment, the input-output characteristic of the projection unit 240 has a characteristic of deviating to the higher brightness side in a lower gradation range with respect to a reference characteristic as shown by the characteristic line 141 in FIG. 4.

Figure 14:
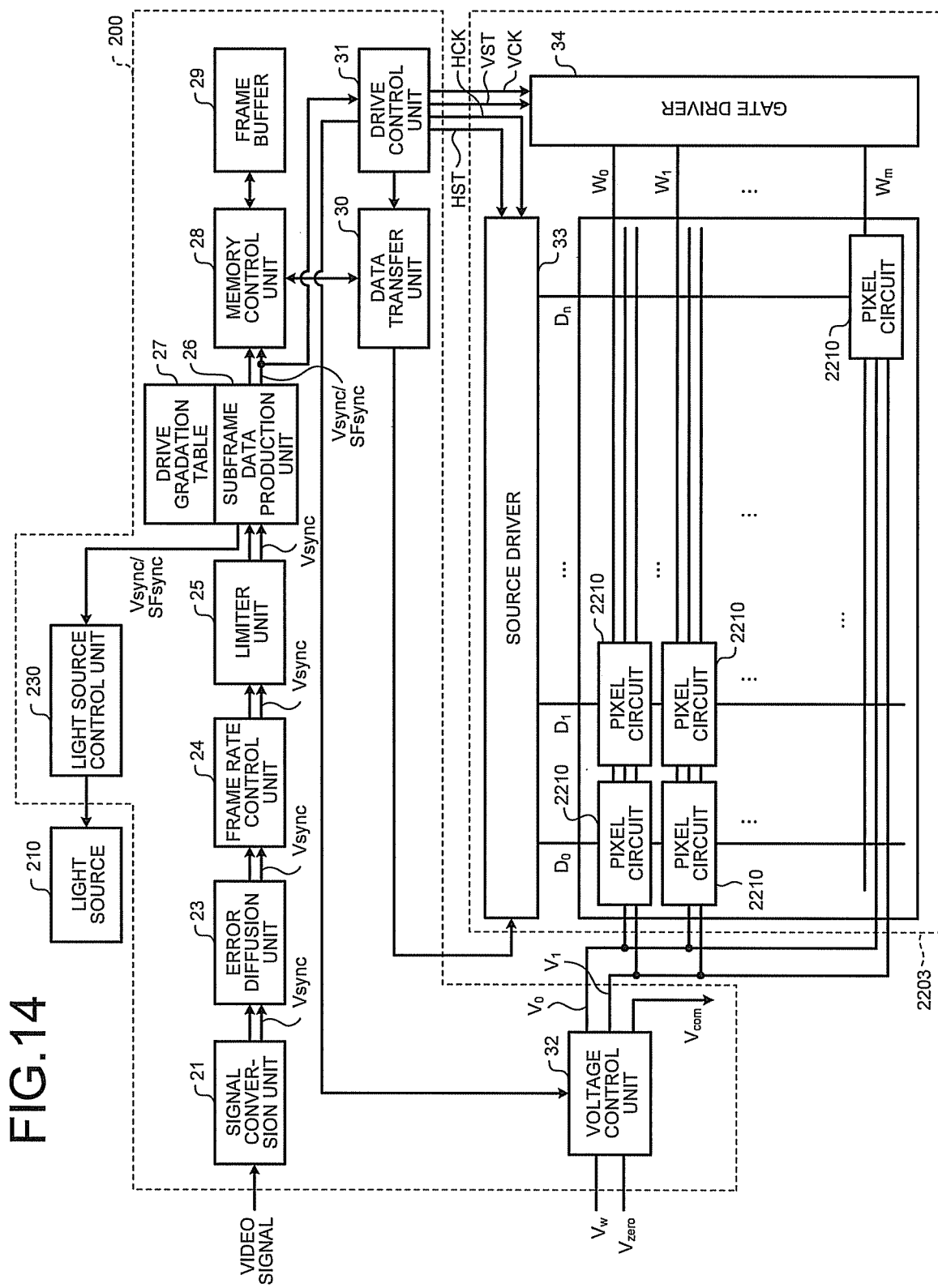
FIG. 14 is a block diagram illustrating an example of a configuration of a video processing-drive unit and a pixel electrode unit according to the second embodiment.

FIG. 14 illustrates an example of a configuration of the video processing and drive unit 200 and the pixel electrode unit 2203 included in the projection apparatus 100b according to the second embodiment. In a similar manner to the aforementioned projection apparatus 100a according to the first embodiment, a digital drive scheme is applied to this projection apparatus 100b according to the second embodiment. The digital drive scheme refers to dividing a frame period of the video signal to produce divided periods, that is, subframes SF, and controlling each pixel of the video signal to an ON state in the number of subframes SF according to a gradation value of the pixel to represent gradation. Hereinafter, as in the above-described first embodiment, suppose that gradation is expressed by thirteen gradations of gradation values "0" to "12", and a frame period is divided equally into twelve divided periods, one less than the number of gradations to create twelve subframes SF1 to SF12.

In FIG. 14, the video processing and drive unit 200 includes a signal conversion unit 21, an error diffusion unit 23, a frame rate control unit 24, a limiter unit 25, a subframe data production unit 26, a drive gradation table 27, a memory control unit 28, a frame buffer 29, a data transfer unit 30, a drive control unit 31, a voltage control unit 32, and a light source control unit 230.

The pixel electrode unit 2203 includes a source driver 33, a gate driver 34, and respective pixel circuits 2210. Here, the source driver 33 and the gate driver 34 may be provided outside of the pixel electrode unit 2203.

In the pixel electrode unit 2203, pixel circuits 2210 are arranged in a matrix, are connected to column data lines $D_0$, $D_1$, ..., $D_n$ in a column direction, respectively, and are connected to row selection lines $W_0$, $W_1$, ..., $W_m$ in a row direction, respectively. Each of the column data lines $D_0$, $D_1, \ldots, D_n$ is connected to the source driver 33. Each of the row selection lines $W_0, W_1, \ldots, W_m$ is connected to the gate driver 34.

The memory control unit 28 is supplied with a frame synchronization signal Vsync and a subframe synchronization signal SFsync from the subframe data production unit 26 described later. In addition, the memory control unit 28 stores subframe data (to be described later) of each subframe SF produced by the subframe data production unit 26 in the frame buffer 29 divided for each subframe SF in response to the subframe synchronization signal SFsync. The frame buffer 29 has double-buffer structure including a first frame buffer and a second frame buffer. The memory control unit 28 can read the subframe data from the first frame buffer while storing video signal data in the second frame buffer.

The drive control unit 31 is supplied with the frame synchronization signal Vsync and the subframe synchronization signal SFsync from the subframe data production unit 26. The drive control unit 31 controls timing of processing for each subframe SF and the like. In accordance with these synchronization signals, the drive control unit 31 provides transmission instructions to the data transfer unit 30, and controls the source driver 33 and gate driver 34. More specifically, in accordance with the frame synchronization signal Vsync and the subframe synchronization signal SFsync, the drive control unit 31 generates a vertical start signal VST, a vertical shift clock signal VCK, a horizontal start signal HST, and a horizontal shift clock signal HCK.

The vertical start signal VST and the horizontal start signal HST specify front timing of the subframe SF, and front timing of the line, respectively. The vertical shift clock signal VCK specifies the row selection lines $W_0, W_1, \ldots, W_m$. Meanwhile, the horizontal shift clock signal HCK performs specification corresponding to the column data lines $D_0, D_1, \ldots, D_n$. The vertical start signal VST and the vertical shift clock signal VCK are supplied to the gate driver 34. The horizontal start signal HST and the horizontal shift clock signal HCK are supplied to the source driver 33.

In accordance with control by the drive control unit 31, the data transfer unit 30 commands the memory control unit 28 to read the subframe data of the specified subframe SF from the frame buffer 29. The data transfer unit 30 receives, from the memory control unit 28, the subframe data read from the frame buffer 29, and transfers the received subframe data to the source driver 33 in accordance with control by the drive control unit 31, for example, on a line-by-line basis.

Every time the source driver 33 receives the subframe data of one line from the data transfer unit 30, the source driver 33 transfers the subframe data to the corresponding pixel circuits 2210 simultaneously using the column data lines $D_0, D_1, \ldots, D_n$. The gate driver 34 activates the row selection line of the row specified by the vertical start signal VST and vertical shift clock signal VCK supplied from the drive control unit 31 among the row selection lines $W_0, W_1, \ldots, W_m$. This allows transfer of the subframe data of each pixel to each of the pixel circuits 2210 of all the columns of the specified row.

Furthermore, the drive control unit 31 generates a voltage timing signal based on the frame synchronization signal Vsync and the subframe synchronization signal SFsync. The voltage timing signal is supplied to the voltage control unit 32. In addition, a zero voltage $V_{zero}$ with a voltage value of 0 V and the saturation voltage $V_w$ are supplied to the voltage control unit 32. With timing indicated by the voltage timing signal, the voltage control unit 32 supplies voltages based on the zero voltage $V_{zero}$ and saturation voltage $V_w$ to respective pixel circuits 2210 as a voltage $V_0$, which is a blanking voltage, and a voltage $V_1$, which is a drive voltage. In addition, the voltage control unit 32 outputs a common voltage $V_{com}$ to be supplied to the counter electrode 2201. Here, the blanking voltage and the drive voltage correspond to a voltage for controlling a pixel to an OFF state and a voltage for controlling a pixel to an ON state, respectively.

Figure 15:
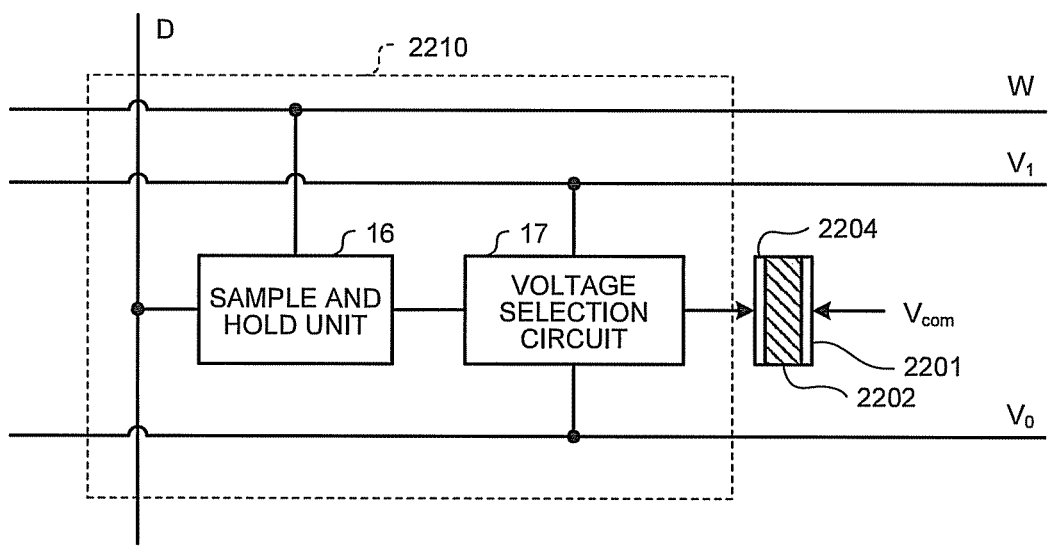
FIG. 15 is a block diagram illustrating a configuration of an example of a pixel circuit according to the second embodiment.

FIG. 15 illustrates a configuration of an example of each of the pixel circuits 2210 according to the second embodiment. The pixel circuit 2210 includes a sample and hold unit 16 and a voltage selection circuit 17, and an output of the voltage selection circuit 17 is supplied to a pixel electrode 2204. Here, the counter electrode 2201 facing the pixel electrode 2204 with the inserted liquid crystal layer 2202 is supplied with the common voltage $V_{com}$. The sample and hold unit 16 is configured using a flip-flop of SRAM (Static Random Access Memory) structure. Signals are input from the column data line D and the row selection line W to the sample and hold unit 16, and an output of the sample and hold unit 16 is supplied to the voltage selection circuit 17. The voltage selection circuit 17 is supplied with the voltage $V_0$ and the voltage $V_1$ from the voltage control unit 32.

Next, an operation of the video processing and drive unit 200 will be described. The digital video signal is supplied to the signal conversion unit 21. The signal conversion unit 21 both extracts the frame synchronization signal Vsync from the supplied video signal, and converts the video signal into video signal data in a predetermined number of bits for output. The signal conversion unit 21 supplies the extracted frame synchronization signal Vsync to the error diffusion unit 23, the frame rate control unit 24, the limiter unit 25, and the subframe data production unit 26, respectively.

In addition, the video signal data that is output from the signal conversion unit 21 undergoes predetermined signal processing by the error diffusion unit 23, the frame rate control unit 24, and the limiter unit 25, and is then supplied to the subframe data production unit 26.

Figure 16:
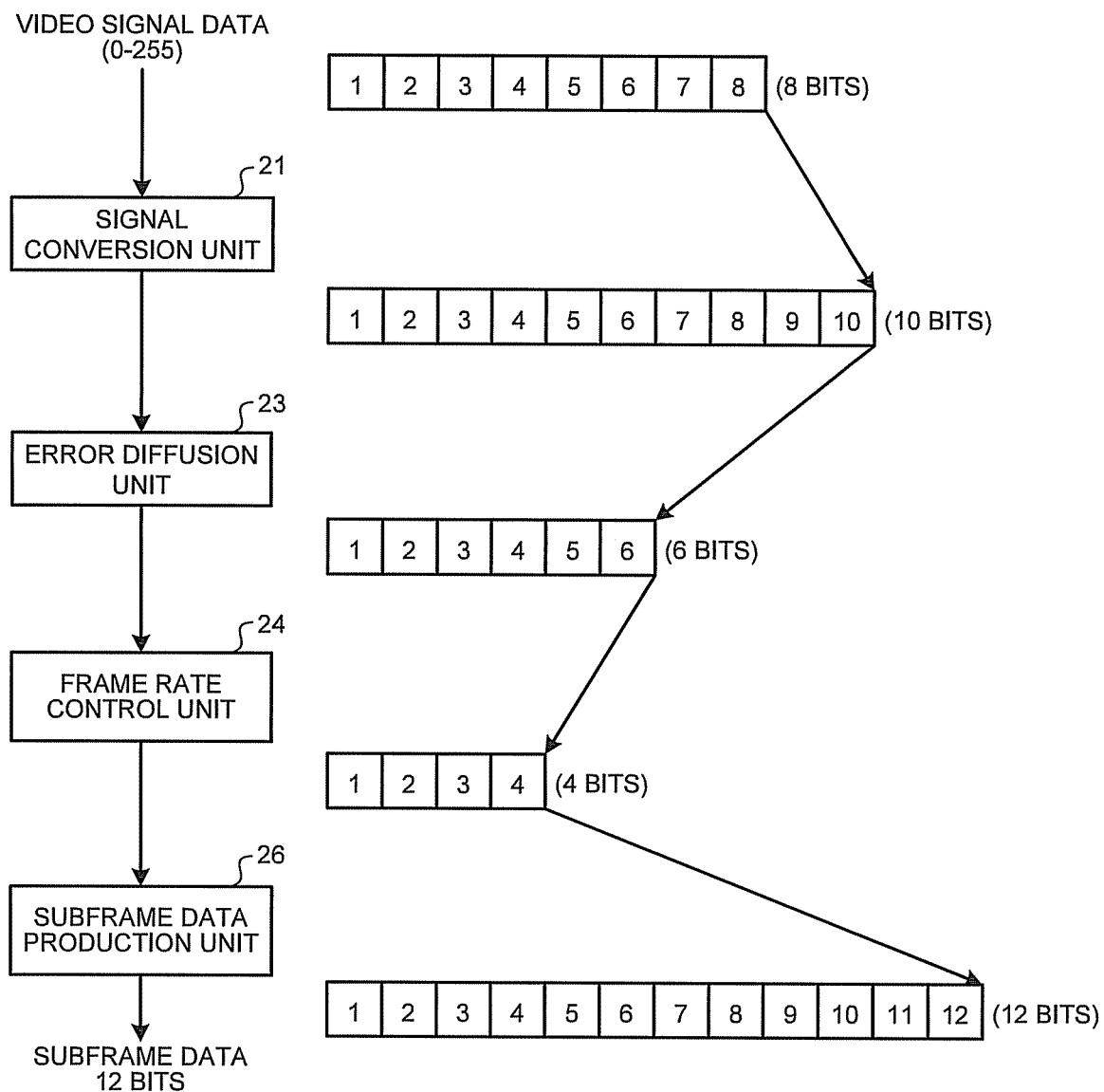
FIG. 16 is a diagram for explaining a flow of processing in a signal conversion unit, an error diffusion unit, a frame rate control unit, and a subframe data creation unit according to the second embodiment.

With reference to FIG. 16, a flow of processing will be described in the signal conversion unit 21, the error diffusion unit 23, the frame rate control unit 24, and the subframe data production unit 26 according to the second embodiment. The description here assumes that the video signal to be input into the signal conversion unit 21 is 8-bit video signal data.

The signal conversion unit 21 converts the input N-bit video signal data into (M+F+D)-bit data having a larger number of bits. Here, a value M represents the number of bits corresponding to the number of subframes SF represented in binary, a value D represents the number of bits to be required for interpolation by the error diffusion unit 23, and a value F represents the number of bits to be required for interpolation by the frame rate control unit 24. Here, each of the value N, value M, value F, and value D is an integer equal to or greater than 1. In the example of FIG. 16, the value N=8, value D=4, value F=2, and value M=4.

The signal conversion unit 21 performs bit number conversion processing, for example, using a look-up table. In general, as described above, a display has input-output characteristics according to a gamma curve of a gamma value $\gamma=2.2$. Therefore, the video signal that is output from the video output apparatus 101 is a signal corrected by the gamma curve according to the gamma value of reciprocal of the gamma value of the display so as to obtain linear gradation representation when displayed on the display.

The signal conversion unit 21 converts the input video signal data by using the look-up table adjusted in advance so as to bring the input-output characteristics of the projection unit 240 close to standard characteristics, that is, the characteristics of the gamma curve of the gamma value γ=2.2. This conversion processing is referred to as calibration. At this time, using the look-up table, the signal conversion unit 21 converts the N-bit video signal data into the (M+F+D)-bit video signal data for output. In this example where the value N=8, value D=4, value F=2, and value M=4, the signal conversion unit 21 converts 8-bit video signal data into 10-bit video signal data for output.

The video signal data converted into (M+F+D) bits by the signal conversion unit 21 is converted into (M+F)-bit data by the error diffusion unit 23 diffusing lower-D-bit information into nearby pixels. In this example where the value N=8, value D=4, value F=2, and value M=4, the error diffusion unit 23 diffuses lower-4-bit information of the 10-bit video signal data of each pixel that is output from the signal conversion unit 21 into nearby pixels, and quantizes the 10-bit video signal data into upper-6-bit data.

An error diffusion method is a method for compensating shortage of gradation by diffusing an error (display error) between the video signal to be displayed and an actually displayed value into nearby pixels. According to the second embodiment, lower 4 bits of the video signal to be displayed are defined as a display error, 7/16 of the display error is added to a pixel right neighbor to the noted pixel, 3/16 of the display error is added to a lower left pixel, 5/16 of the display error is added to a pixel directly under the noted pixel, and 1/16 of the display error is added to a lower right pixel. This processing is performed on each pixel, for example, from left to right within one frame of video, and this processing is performed on each line from top to bottom within one frame of video.

An operation of the error diffusion unit 23 will be described in more detail. While the noted pixel diffuses the error as described above, the error diffused by an immediately preceding noted pixel is added to the noted pixel. The error diffusion unit 23 first reads, from an error buffer, the error diffused from the immediately preceding noted pixel, and adds the read error to the noted pixel of the input 10-bit video signal data. The error diffusion unit 23 divides the 10-bit noted pixel to which a value of the error buffer is added into upper 6 bits and lower 4 bits.

A value of the divided lower four bits, which is denoted as (lower four bits, display error), is as follows.
(0000, 0)
(0001, +1)
(0010, +2)
(0011, +3)
(0100, +4)
(0101, +5)
(0110, +6)
(0111, +7)
(1000, −7)
(1001, −6)
(1010, −5)
(1011, −4)
(1100, −3)
(1101, −2)
(1110, −1)
(1111, 0)

The display error corresponding to the value of the divided lower 4 bits is added to the error buffer for storage. In addition, the value of the divided lower 4 bits is compared with a threshold, and when the value is larger than "1000" in binary notation, "1" is added to the value of the upper 6 bits. Then, upper 6-bit data is output from the error diffusion unit 23.

The video signal data converted into (M+F) bits by the error diffusion unit 23 is input into the frame rate control unit 24. The frame rate control unit 24 performs frame rate control processing for displaying a pseudo gradation, by setting m frames (m is an integer equal to or greater than 2) for one-pixel display of the display element 220 as one period, performing ON display in n frames (n is an integer of m>n>0) of the period, and performing OFF display in remaining (m−n) frames.

In other words, the frame rate control processing is processing for making a pseudo intermediate gradation by using rewriting of a screen and an afterimage effect of a retina. For example, by rewriting a certain pixel alternately with a gradation value "0" and a gradation value "1" for each frame, the pixel appears to have a gradation value intermediate between the gradation value "0" and the gradation value "1" to human eyes. Then, control of such alternate rewriting of the gradation value "0" and the gradation value "1", for example, for four frames as one set, enables pseudo representation of three-level gradation between the gradation value "0" and gradation value "1".

Figure 17:
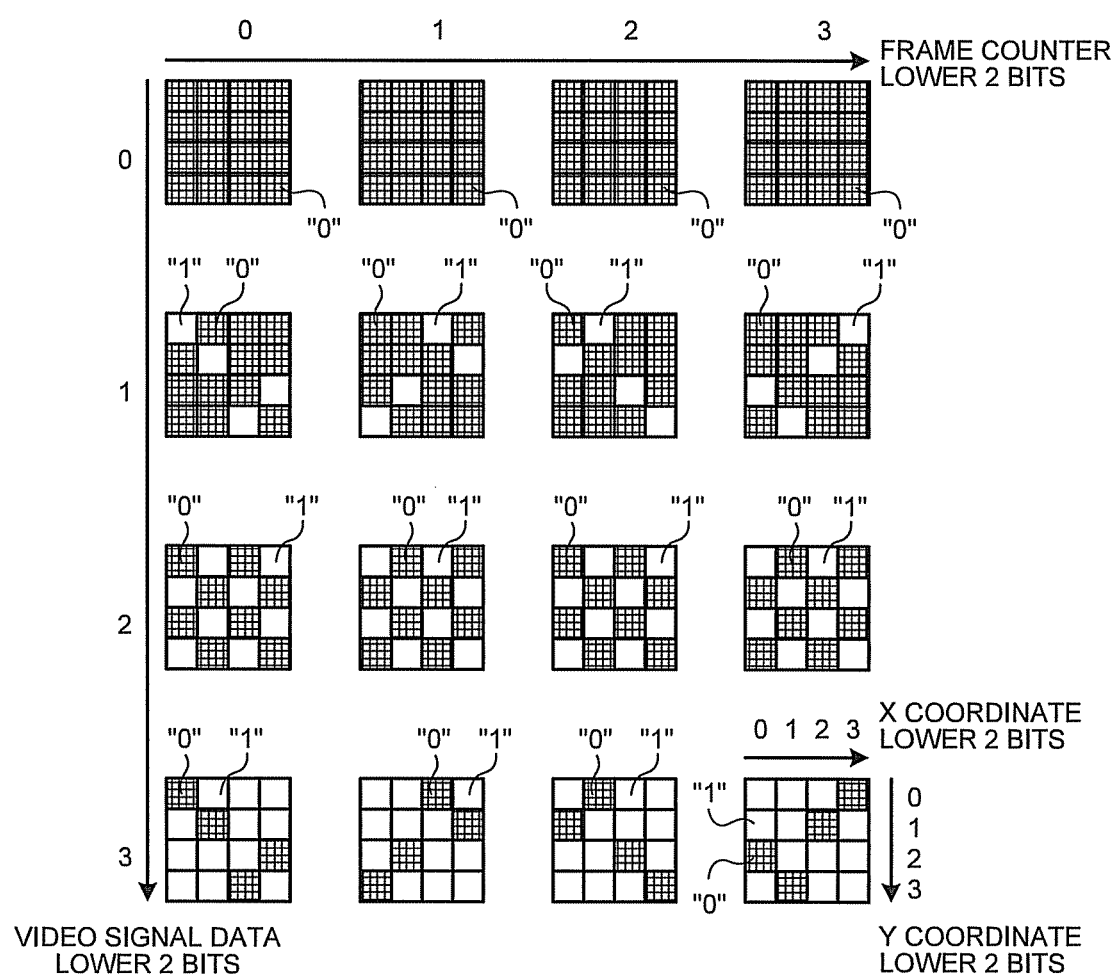
FIG. 17 illustrates an example of a frame rate control table according to the second embodiment.

The frame rate control unit 24 includes a frame rate control table illustrated in FIG. 17. The frame rate control unit 24 further includes a frame counter that counts frames, for example, based on the frame synchronization signal Vsync. In the example of FIG. 17, in the frame rate control table, four-by-four matrices (referred to as small matrices) in which a value "0" or "1" is specified in each cell are further arranged in a four-by-four matrix (referred to as a large matrix).

Each column of the large matrix is specified by a lower 2-bit value in a counter value of the frame counter. Each row of the large matrix is specified by a lower 2-bit value in the 6-bit video signal data that is input into the frame rate control unit 24. Each column and each row of each small matrix are specified based on positional information of a pixel within a display area, that is, coordinates of the pixel. More specifically, each column of each small matrix is specified by a lower 2-bit value of an X coordinate of the pixel, and each row is specified by a lower 2-bit value of a Y coordinate of the pixel.

The frame rate control unit 24 specifies a position within the frame rate control table from a lower F-bit value of supplied (M+F)-bit video signal data, positional information on the pixel, and frame count information. The frame rate control unit 24 then adds a value (value "0" or value "1") at the position to upper M bits. Thereby (M+F)-bit video signal data is converted into M-bit data.

In this example where the value F=2 and value M=4, the 6-bit video signal data that is output from the error diffusion unit 23 is input into the frame rate control unit 24. The frame rate control unit 24 acquires the value "0" or value "1" from the frame rate control table, based on the lower 2-bit information of this video signal data, positional information in the display area, and frame counter information. The frame rate control unit 24 then adds the acquired value to an upper 4-bit value separated from 6 bits of the input video signal data.

More specifically, the frame rate control unit 24 divides the input six-bit video signal data (pixel data) into upper 4-bit data and lower 2-bit data. The frame rate control unit 24 specifies a position in the large matrix and small matrix of the frame rate control table of FIG. 17, by using a value of a total of 8 bits including the lower 2-bit data obtained by bit-separation, lower 2 bits of the X coordinate and lower 2 bits of the Y coordinate of the pixel in the display area, as well as lower 2 bits of the counter value of the frame counter.

The frame rate control unit 24 then acquires the value "0" or value "1" specified by the specified position. The frame rate control unit 24 adds the acquired value "0" or value "1" to upper 4-bit data separated from the input video signal data, and outputs the data as O-bit video signal data.

Thus, the frame rate control unit 24 controls on/off of the pixel for each gradation on a pixel block basis. This enables further representation of pseudo gradation between two continuous gradations.

With reference to FIG. 14, the 4-bit video signal data that is output from the frame rate control unit 24 is supplied to the limiter unit 25. The limiter unit 25 limits the maximum value of the gradation value of the supplied video signal data to "12". The video signal data with the maximum value of the gradation value limited to "12" by the limiter unit 25 is supplied to the subframe data production unit 26. The subframe data production unit 26 converts the supplied video signal data into 12-bit data by using the drive gradation table 27.

In addition, the subframe data production unit 26 generates the subframe synchronization signal SFsync based on the supplied frame synchronization signal Vsync. The subframe data production unit 26 supplies the frame synchronization signal Vsync and the subframe synchronization signal SFsync to the memory control unit 28 and the drive control unit 31, and to the light source control unit 230.

FIG. 18 illustrates an example of the drive gradation table 27 applicable to the second embodiment. In FIG. 18, in a similar manner to the aforementioned FIG. 3, each column is the subframe SF1, SF2, . . . , SF12 from left to right. Among these subframes, the subframe SF1 is a subframe at the front end of the frame period, and the subframe SF12 is a subframe at the rear end of the frame period. In FIG. 18, the gradation value increases by 1 from 0 in each row from top to bottom. The gradation value "0" is the lowest (darkest) gradation, and the gradation value "9" is the highest (brightest) gradation.

According to the second embodiment, contrary to the example of the first embodiment described above with reference to FIG. 3, the number of subframes according to the gradation value of the pixel is selected sequentially from the rear end of the frame period, and in the selected subframes, the pixel is controlled to an ON state. In FIG. 18, a hatched cell of the value "1" represents controlling the pixel to an ON state, while a cell of the value "0" represents controlling the pixel to an OFF state. Thus, the drive gradation table 27 stores the values that represent on/off control of the pixel in association with the subframes SF1 to SF12 and the gradation values.

Thus, according to the second embodiment, in a similar manner to the aforementioned first embodiment, the subframes for performing ON and OFF control are allocated in advance for each gradation.

With reference to the drive gradation table 27 in accordance with the video signal data, the subframe data production unit 26 converts data of each pixel into data of a value "0" or value "1" (hereinafter referred to as 0/1 data) for each subframe SF, and produces the subframe data.

For example, with reference to the aforementioned FIG. 6, in the subframe SF1, the pixels of coordinates $(x_0, y_0)$ to $(x_4, y_0)$ with the gradation values "3", "1", "0", "5", and "9" are respectively converted into 0/1 data of the value "0", "0", "0", "0", and "0", and become subframe data of the subframe SF1. The pixels are respectively converted into 0/1 data of the values "0", "0", "0", "0", and "1" in the subframe SF4, and become subframe data of the subframe SF4. The pixels are respectively converted into 0/1 data of the values "1", "1", "0", "1", and "1" in the subframe SF12, and become subframe data of the subframe SF12.

Figure 19:
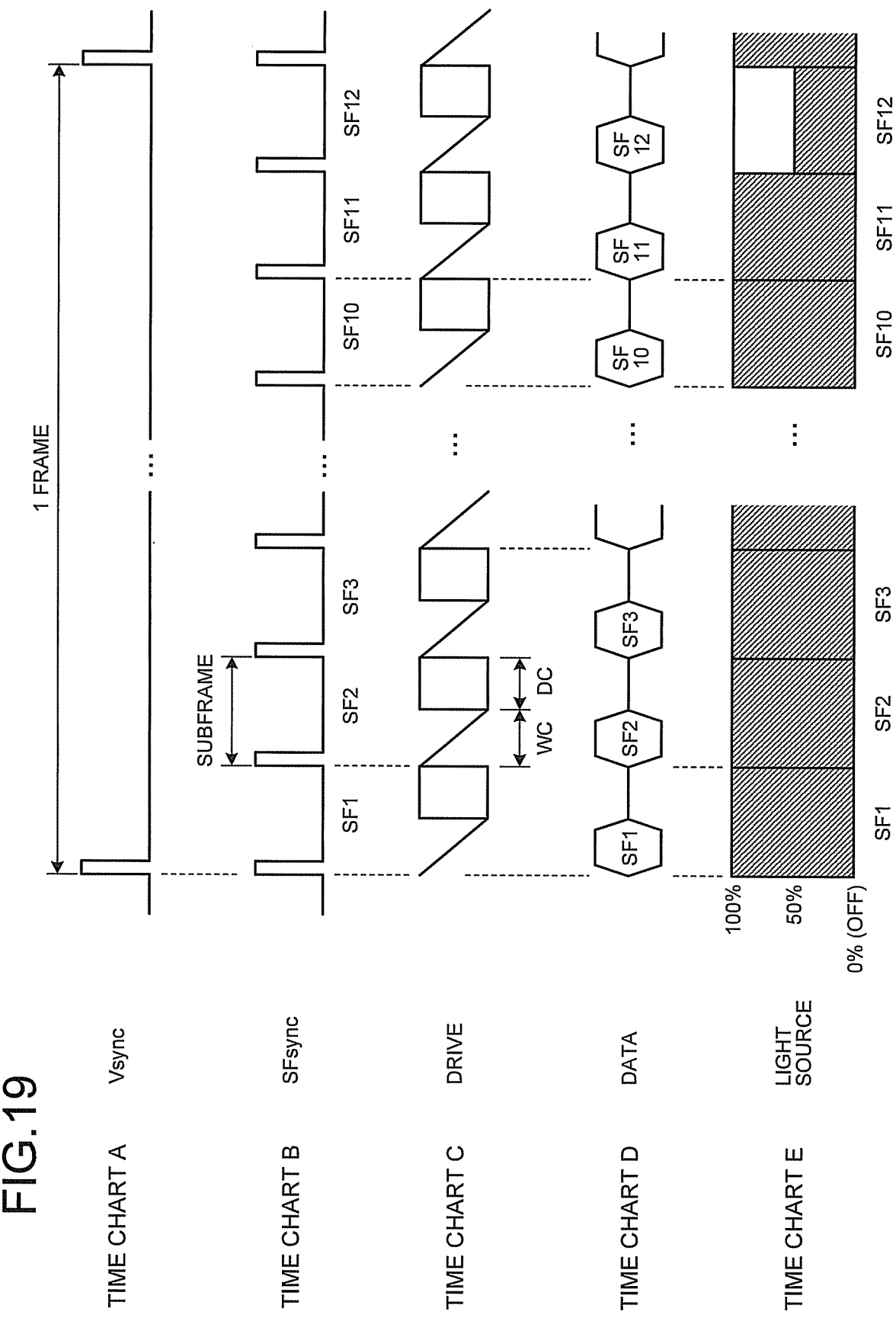
FIG. 19 is a time chart illustrating an example of control according to the second embodiment.

FIG. 19 is a time chart illustrating an example of control according to the second embodiment. The time chart of FIG. 19 corresponds to the aforementioned time charts of FIG. 5, and include driving timing regarding the display element 220 and driving timing of the light source 210. TIME CHART A in FIG. 19 and TIME CHART B in FIG. 19 illustrate examples of the frame synchronization signal Vsync and the subframe synchronization signal SFsync, respectively. The example of TIME CHART B in FIG. 19 corresponds to the aforementioned FIG. 18, and the one-frame period is divided into 12 subframes SF1 to SF12, the number of which is one less than the number of gradations.

TIME CHART C in FIG. 19 illustrates an example of driving timing of the display element 220, and TIME CHART D in FIG. 19 illustrates an example of transfer timing of the video signal data to the pixel electrode unit 2203. In addition, TIME CHART E in FIG. 19 illustrates an example of control of the light source 210.

In TIME CHART C in FIG. 19 a period WC represents a data transfer period for transferring video signal data of each subframe SF to all the pixel circuits 2210 included in the pixel electrode unit 2203. A period DC represents a driving period for driving the pixel circuits 2210. The period WC and period DC are disposed in one subframe SF. The period WC starts with start timing of the subframe SF, and after completion of the period WC, the period DC starts. The period DC ends with completion timing of the subframe SF.

Within the one-frame period, in order of subframes SF1, SF2, . . . , SF11, SF12 from the front in a time base direction, subframe data of each subframe SF1, SF2, . . . , SF11, SF12 is read from the frame buffer 29, and is transferred to each pixel circuit 2210 in the period WC. The transferred subframe data is held in the sample and hold unit 16 of each pixel circuit 2210.

As an example, the data transfer unit 30 transfers the subframe data to the source driver 33 on a line-by-line basis in accordance with control by the drive control unit 31. In accordance with control by the drive control unit 31, the source driver 33 writes the transferred subframe data, for example, in registers respectively corresponding to the data lines $D_0, D_1, \ldots, D_n$ for each pixel for holding. Here, the data to be held for each pixel is 0/1 data of a value "0" or value "1" obtained through conversion of the pixel gradation value in accordance with the drive gradation table 27.

In addition, in accordance with control by the drive control unit 31, the gate driver 34 sequentially selects the row selection lines $W_0, W_1, \ldots, W_m$, with transfer timing of the subframe data on a line-by-line basis. This causes the sample and hold unit 16 of each pixel circuit 2210 selected by the row selection lines $W_0, W_1, \ldots, W_m$ to acquire and hold 0/1 data of each pixel held in the source driver 33. This causes the sample and hold units 16 of all the pixel circuits 2210 included in the pixel electrode unit 2203 to hold 0/1 data of the pixels in the period WC, respectively.

In the period DC, all the pixel circuits 2210 included in the pixel electrode unit 2203 are driven. With reference to FIG. 15, drive control of the pixel circuits 2210 will be described. In the period WC in which 0/1 data is transferred to each pixel circuit 2210, it is necessary to make the pixel in a blanking state regardless of the value of 0/1 data held in the sample and hold unit 16. Therefore, in accordance with control by the drive control unit 31, the voltage control unit 32 sets the voltage $V_0$, voltage $V_1$, and common voltage $V_{com}$ as identical potential (for example, earth potential) in the period WC.

After the period WC ends, the period DC, which is the driving period, starts. In accordance with control by the drive control unit 31, the voltage control unit 32 drives each pixel circuit 2210 in each of a period DC #1 and DC #2 obtained through equal division of the period DC. In the period DC #1, the voltage control unit 32 sets the voltage $V_1$ to the saturation voltage $V_w$, and sets the voltage $V_0$ and common voltage $V_{com}$ to earth potential. In the period DC #2, contrary to the period DC #1, the voltage control unit 32 sets the voltage $V_1$ to earth potential, and sets the voltage $V_0$ and common voltage $V_{com}$ to the saturation voltage $V_w$.

In the pixel circuit 2210, when 0/1 data held in the sample and hold unit 16 is a value "0", the voltage selection circuit 17 selects the voltage $V_0$ as the voltage to be applied to the pixel electrode 2204. In the period DC #1, a voltage Vpe of the pixel electrode 2204 and the common voltage $V_{com}$ to be applied to the counter electrode 2201 are earth potential. Therefore, the voltage to be applied to the liquid crystal layer 2202 becomes 0 [V], and a drive state of the liquid crystal layer 2202 becomes in a blanking state (OFF state).

In the pixel circuit 2210, when 0/1 data held in the sample and hold unit 16 is a value "1", the voltage selection circuit 17 selects the voltage $V_1$ as the voltage to be applied to the pixel electrode 2204. In the period DC #1, the voltage Vpe of the pixel electrode 2204 becomes the saturation voltage $V_w$, and the common voltage $V_{com}$ to be applied to the opposite electrode 2201 becomes earth potential. Therefore, the voltage to be applied to the liquid crystal layer 2202 becomes the positive saturation voltage $V_w$ with respect to potential of the counter electrode 2201, and the liquid crystal layer 2202 becomes in a drive state (ON state). In addition, in the period DC #2, the voltage Vpe of the pixel electrode 2204 becomes earth potential, and the common voltage $V_{com}$ to be applied to the counter electrode 2201 becomes the saturation voltage $V_w$ (saturation voltage $+V_w$). The voltage to be applied to the liquid crystal layer 2202 becomes the negative saturation voltage $V_w$ (saturation voltage $-V_w$) with respect to potential of the counter electrode 2201, and the liquid crystal layer 2202 becomes in a drive state (ON state).

By applying the voltages with an identical absolute value and different polarity (saturation voltage $+V_w$ and $-V_w$) to the liquid crystal layer 2202 for an identical period, the voltage applied to the liquid crystal layer 2202 becomes 0 [V] on average for a long time, which may prevent burn-in of the liquid crystal.

Returning to the description of FIG. 19, TIME CHART E in FIG. 19 illustrates an example of the light amount control on the light source 210 by the light source control unit 230. As described with reference to FIG. 18, in the second embodiment, the subframe SF12 is a subframe in which a pixel is ON-controlled at the lowest gradation except black display (gradation value "0"). In the subframe SF12, a pixel is brought into the driven state (ON state) at all the gradations other than the gradation of gradation value "0". Therefore, the light source control unit 230 performs control to reduce the light amount of the light source 210 at a reduction ratio of 50%, for example, in the subframe SF12 at the rear end of the frame period, according to the frame synchronization signal Vsync and the subframe synchronization signal SFsync provided from the subframe data creation unit 26, and controls the light amount of the light source 210 to a 100% light amount in the other subframes SF1 to SF11.

Thus, even when the light source control to reduce the light amount of the light source 210 is performed at the rear end of the frame period, as in the above-described first embodiment, display of an image according to a video signal of an input value in a lower gradation range can be brought closer to an intended image than in the existing art, resulting in an improvement in the display quality compared to the existing art.

The present invention achieves effects of allowing an improvement in display quality when a liquid crystal display element is driven by a digital drive method.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:
1. A light source drive device comprising:
a divided period production unit configured to produce divided periods as subframes by dividing a frame period of a video signal; and
a light source control unit configured to drive a light source for emitting light to display elements that are ON-OFF controlled in each of the subframes according to the video signal on a pixel-by-pixel basis to represent respective gradations of the video signal, wherein
a first subframe corresponding to a lowest gradation of the video signal except black display and second subframes being other than the first subframe, and
the light source control unit is further configured to control a first light amount emitted by the light source before being modulated by the display elements in the first subframe to become a light amount before being modulated by the display elements which is more than the light amount for black display and lower than a second light amount emitted by the light source before being modulated by the display elements in the second subframes, wherein
any gradation except the black display is generated by both of an ON-OFF control of the display elements in each of the subframes and a light amount control of the light amount emitted by the light source in each of the subframes such that the first light amount is emitted in all the subframes and the second light amount is emitted in the subframes except the first subframe, and which is controlled to be reduced uniformly at a predetermined reduction ratio in the first subframe, and
a minimum resolution at any gradation value except the black display is calculated by an expression:

$$L'(n)=((b \times n-(b-a))/(b \times n)) \times L(n)$$

wherein a is the first light amount, b is the second light amount, n is a gradation value more than 0, and L(n) is the minimum resolution in a case in which the first light amount and the second light amount are the same and is assumed to be 1,
controlled to be less than 1 and to become smaller as the gradation value becomes smaller, and
controlled to change a range of the gradation value for which a predetermined improvement of a display quality in a darker image area can be obtained by changing a characteristic of a curve which shows a relationship between the gradation value and a rate $L'(n)/L(n)$ by controlling the first light amount.
2. The light source drive device according to claim 1,
wherein the light source control unit is further configured to control the light amount of the light source to become the first light amount in one or more of the second subframes following the first subframe.

3. A light source drive method comprising:
producing divided periods as subframes by dividing a frame period of a video signal; and
driving a light source for emitting light to display elements that are ON-OFF controlled in each of the subframes according to the video signal on a pixel-by-pixel basis to represent respective gradations of the video signal, wherein
driving the light source, a first subframe corresponding to a lowest gradation except black display and second subframes being other than the first subframe, and controlling a first light amount emitted by the light source before being modulated by the display elements in at least the first subframe to become a light amount before being modulated by the display elements which is more than the light amount for black display and lower than a second light amount emitted by the light source before being modulated by the display elements in the second subframes, wherein
any gradation except the black display is generated by both of an ON-OFF control of the display elements in each of the subframes and a light amount control of the light amount modulated by the display elements in each of the subframes such that the first light amount is emitted in all the subframes and the second light amount is emitted except the first subframe, and which is controlled to be reduced uniformly at a predetermined reduction ratio in the first subframe, and
a minimum resolution at any gradation value except the black display is calculated by an expression:

$$L'(n)=((b \times n-(b-a))/(b \times n)) \times L(n)$$

wherein a is the first light amount, b is the second light amount, n is a gradation value more than 0, and L(n) is the minimum resolution in a case in which the first light amount and the second light amount are the same and is assumed to be 1,
controlled to be less than 1 and to become smaller as the gradation value becomes smaller, and
controlled to change a range of the gradation value for which a predetermined improvement of a display quality in a darker image area can be obtained by changing a characteristic of a curve which shows a relationship between the gradation value and a rate L'(n)/L(n) by controlling the first light amount.

4. A display apparatus comprising:
a light source;
display elements configured to modulate light emitted from the light source according to a video signal;
a divided period production unit configured to produce divided periods as subframes by dividing a frame period of the video signal;
a drive unit configured to control ON and OFF states of each pixel of the display elements in each of the subframes according to the video signal to represent respective gradations of the video signal; and
a light source control unit configured to drive the light source, wherein
the light source control unit is further configured to control, a first subframe corresponding to a lowest gradation except black display and second subframes being other than the first subframe, a first light amount emitted by the light source before being modulated by the display elements in at least the first subframe to become a light amount before being modulated by the display elements which is more than the light amount for black display and lower than a second light amount emitted by the light source before being modulated by the display elements in the second subframes, wherein
any gradation except the black display is generated by both of an ON-OFF control of the display elements in each of the subframes and a light amount control of the light amount modulated by the display elements in each of the subframes such that the first light amount is emitted in all the subframes and the second light amount is emitted except the first subframe, and which is controlled to be reduced uniformly at a predetermined reduction ratio in the first subframe, and
a minimum resolution at any gradation value except the black display is calculated by an expression:

$$L'(n)=((b \times n-(b-a))/(b \times n)) \times L(n)$$

wherein a is the first light amount, b is the second light amount, n is a gradation value more than 0, and L(n) is the minimum resolution in a case in which the first light amount and the second light amount are the same and is assumed to be 1,
controlled to be less than 1 and to become smaller as the gradation value becomes smaller, and
controlled to change a range of the gradation value for which a predetermined improvement of a display quality in a darker image area can be obtained by changing a characteristic of a curve which shows a relationship between the gradation value and a rate L'(n)/L(n) by controlling the first light amount.

5. The display apparatus according to claim 4, wherein the light source control unit is further configured to control the light amount of the light source to become the first light amount in one or more of the second subframes following the first subframe.

6. The display apparatus according to claim 4, wherein the drive unit is further configured to control the ON and OFF states of the pixels in units of blocks of the pixels for each of the gradations of the video signal.

* * * * *